US012711124B2

(12) United States Patent
Singh et al.

(10) Patent No.: US 12,711,124 B2
(45) Date of Patent: Aug. 18, 2026

(54) FILE RECORD VALIDATION

(71) Applicant: Honeywell International Inc., Charlotte, NC (US)

(72) Inventors: Ankit Singh, Apex, NC (US); Shaun Vallejo, Red Bank, NJ (US)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 18/945,522

(22) Filed: Nov. 13, 2024

(65) Prior Publication Data

US 2026/0133956 A1 May 14, 2026

(51) Int. Cl.

| | |
|---|---|
| ***G06F 7/00*** | (2006.01) |
| ***G06F 16/11*** | (2019.01) |
| ***G06F 16/16*** | (2019.01) |
| ***G06F 16/23*** | (2019.01) |
| ***G06F 17/00*** | (2019.01) |

(52) U.S. Cl.

CPC ........ *G06F 16/2365* (2019.01); *G06F 16/116* (2019.01); *G06F 16/16* (2019.01)

(58) Field of Classification Search

None

See application file for complete search history.

(56) References Cited

U.S. PATENT DOCUMENTS

| | | | | |
|---|---|---|---|---|
| 2023/0351328 | A1* | 11/2023 | Benson .............. | G06Q 10/0875 |
| 2023/0418793 | A1* | 12/2023 | Urdiales ............... | G06F 16/215 |
| 2024/0242527 | A1* | 7/2024 | Sathi ..................... | G06F 40/166 |

* cited by examiner

*Primary Examiner* — Tuan A Pham

(74) *Attorney, Agent, or Firm* — Alston & Bird LLP

(57) ABSTRACT

Techniques for validating and modifying file records are disclosed. A reference specification is obtained, indicating valid data labels and data points, where each data point is classified into a data label. A semantic assessment is performed between a file record and the reference specification to determine semantically conforming data descriptors and data labels. It is then determined whether aspects of data elements associated with the data descriptors conform with correlated aspects of data points linked to the data labels. Based on the determination, a data modification workflow is triggered to transform non-conforming aspects of data elements. The file record is subsequently modified to include the transformed data elements. The present subject matter may enable automated validation and modification of file records to ensure conformity with the reference specification.

20 Claims, 14 Drawing Sheets

SYSTEM 102
PROCESSOR 104
DATA RECEPTION UNIT 606
DATA PROCESSING UNIT 608
DATA MODIFICATION UNIT 610
INDICATION GENERATION UNIT 612
INTERFACE(S) 602
OTHER UNIT(S) 604
DATA SOURCE 106
114
118
COMMUNICATION NETWORK 112
DESTINATION 110
116
CONFIGURATION FILE SOURCE 108

COMPUTER-READABLE MEDIUM 1004

COMPUTER-READABLE INSTRUCTION 1008

[[OBTAIN, IN RESPONSE TO RECEIVING A FILE RECORD FOR VALIDATION THEREOF, A REFERENCE SPECIFICATION INDICATING A PLURALITY OF VALID DATA LABELS AND A PLURALITY OF VALID DATA POINTS, WHEREIN EACH OF THE PLURALITY OF DATA POINTS IS CLASSIFIED INTO A DATA LABEL FROM AMONGST THE PLURALITY OF DATA LABELS, AND WHEREIN THE FILE RECORD COMPRISES A PLURALITY OF DATA DESCRIPTORS;

PERFORM A SEMANTIC ASSESSMENT FOR EACH OF THE PLURALITY OF DATA LABELS AND EACH OF THE PLURALITY OF DATA DESCRIPTORS TO DETERMINE A SEMANTIC SCORE FOR EACH OF THE PLURALITY OF DATA DESCRIPTORS OF THE FILE RECORD;

IDENTIFY ONE OR MORE DATA DESCRIPTORS SEMANTICALLY MATCHING WITH A DATA LABEL;

DETERMINE WHETHER AN ASPECT OF ONE OR MORE DATA ELEMENTS CONFORMS WITH A CORRELATED ASPECT ASSOCIATED WITH EACH OF THE PLURALITY OF DATA POINTS LINKED WITH THE DATA LABEL;

TRIGGER TRANSFORMATION OF THE ASPECT OF THE ONE OR MORE DATA ELEMENTS BASED ON THE CORRELATED ASPECT;

MODIFY THE FILE RECORD TO INCLUDE THE ONE OR MORE DATA ELEMENTS HAVING THE TRANSFORMED ASPECT; AND

CAUSE RENDERING OF THE MODIFIED FILE RECORD WITH THE ONE OR MORE DATA ELEMENTS HAVING THE TRANSFORMED ASPECT]]

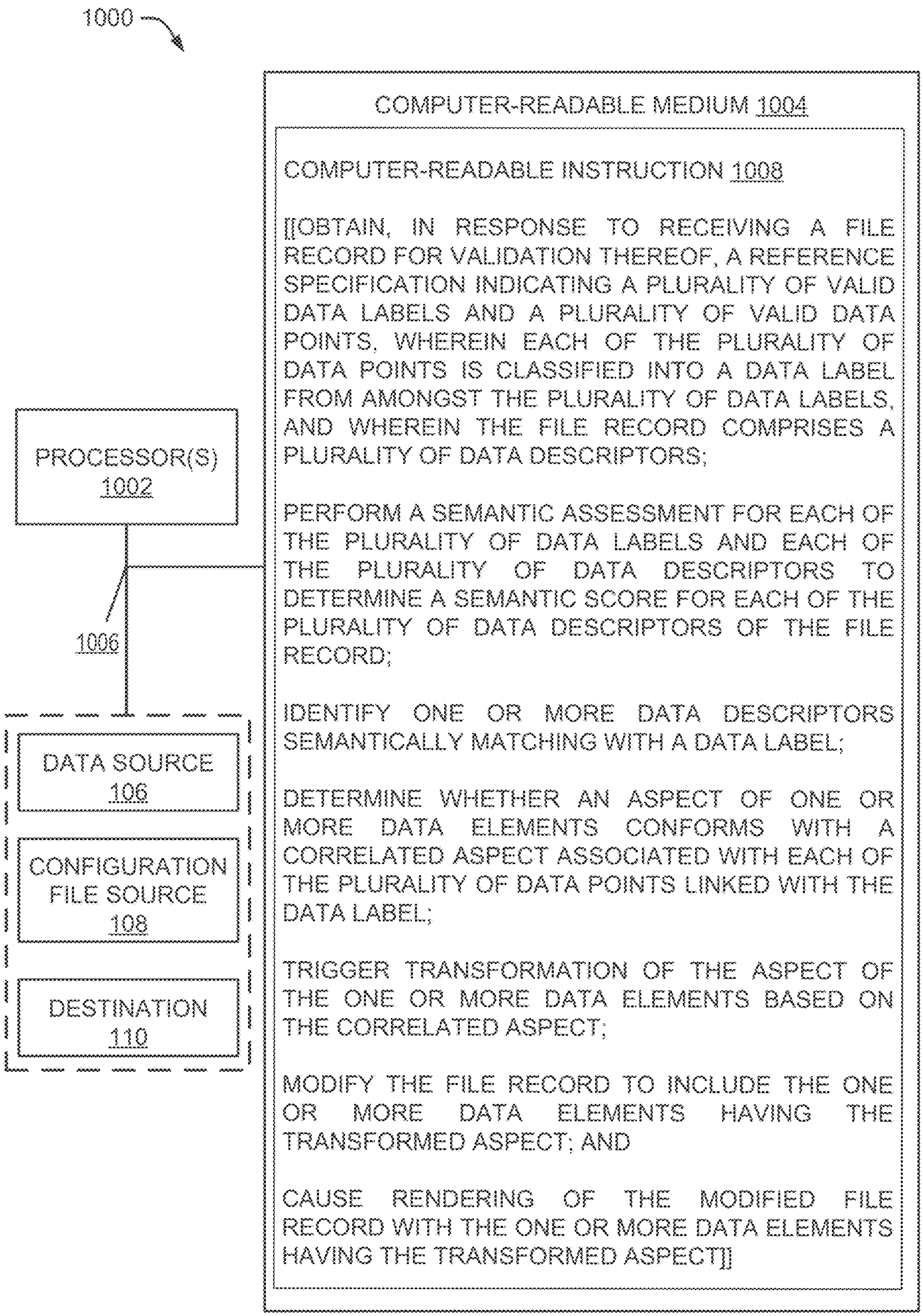

Fig. 10

FILE RECORD VALIDATION

BACKGROUND

In computing environments, the exchange of data and files between disparate entities is a ubiquitous and essential operation. Various devices, resources, applications, platforms, and/or databases are generally interconnected to facilitate communication and flow of information or data between the diverse entities or components. For example, organizations and/or individuals may frequently move data across various systems, applications, platforms, and/or databases for various purposes. However, such processes are often hindered by the fact that different entities or components of the computing environment(s) may follow distinct sets of policies and have different requirements. Incompatibilities between the source and destination entities or components introduce several challenges that hinder the communication and exchange of data and/or files.

BRIEF DESCRIPTION OF DRAWINGS

The detailed description is described with reference to the accompanying figures. It should be noted that the description and figures are merely examples of the present subject matter and are not meant to represent the subject matter itself.

FIG. 10 illustrates a non-transitory computer-readable medium for file record validation, in accordance with an example of the present subject matter.

Figure 1A:
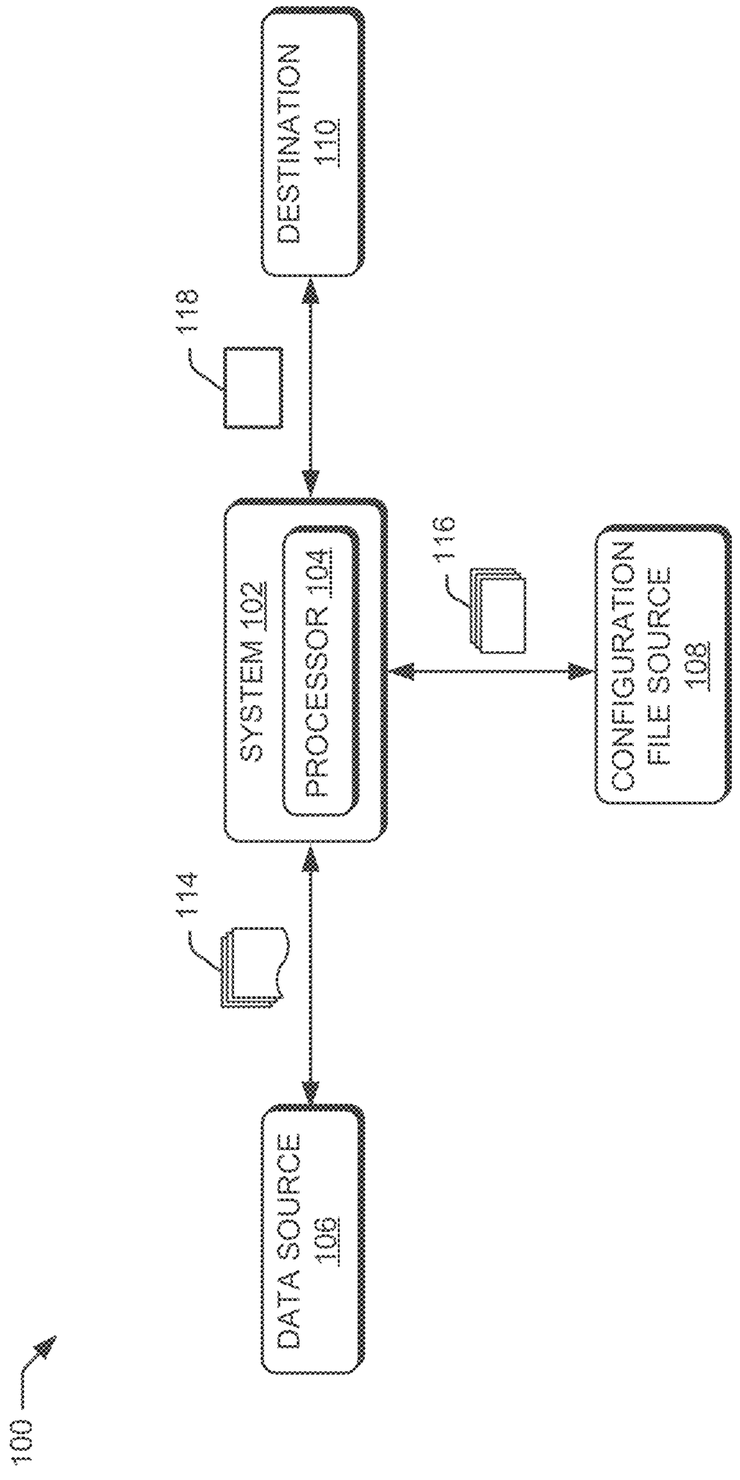
FIGS. 1A to 1D illustrate block diagrams of a computing environment, according to an example implementation of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In computing environments, multiple entities may exchange data and/or files therebetween for different purposes. For example, one or more applications may extract or on-board data from one or more other applications or databases. Such extraction may be performed, in one example, to collect data and/or generate outcomes or results. Similarly, entities, for example, databases, software applications, platforms, servers, client devices, computing systems, and other resources or devices may exchange data and files therebetween for different purposes and to perform different tasks. Thus, data or files are transmitted, received, or otherwise exchanged between various entities in a network or computing environment. Such communications and exchanges may be frequent and integral aspects of interactions and various operations or workflows.

However, such communication and exchange of data between entities may experience several challenges. For example, different devices, applications, or platforms may follow distinct sets of policies, business rules, formatting rules, protocols, and other different requirements. Thus, the data that may be compatible or acceptable for one entity, may be incompatible or unacceptable for another entity. Such incompatibilities can manifest in various ways, for example, differences in data structure, field naming conventions, data types, formatting requirements, or even the presence or absence of certain elements in data. When such data or files are imported from one entity to another, the other entity fails to accurately implement or execute workflows, process the data completely or in a desired manner, and/or generate acceptable outcomes or results.

For instance, data or file incompatibility may lead to incorrect processing and generation of erroneous results in various ways. In some cases, when data formats or structures are incompatible, the data may be misinterpreted or improperly handled, thereby resulting in inaccurate processing or computations, flawed analyses, and incorrect outputs. For example, if numerical data is expected but alphabetical data is received, the performance of intended operations or workflow would produce nonsensical results. In another example, the data may be imported from a data source and processed to generate different visualizations, for instance, dashboards and graphs. However, such incompatible data may either lead to failures in the generation of such visualizations or generate erroneous visualizations, leading to potential errors in decision-making. Further, data incompatibility may also arise from differences in measurement units, encoding schemes, or data representations across different systems, applications, or platforms. In such cases, the misalignment of data interpretations may result in significant discrepancies in the final output, potentially leading to incorrect decision-making or flawed conclusions based on erroneous results.

In some aspects, incompatible data may also cause unexpected behaviour in software applications or workflows. For example, an application designed to work with one data format may encounter errors or crashes when presented with incompatible data, potentially leading to instability and/or data corruption. Thus, incompatible data may lead to erroneous outcomes or validation failures, thereby increasing errors and termination rate of the workflows or processes. Further, processing such incompatible data causes unnecessary utilization of computing resources. Additionally, when integrating data from multiple sources, incompatibilities in data structures, schemas, or semantics may lead to incorrect merging or association of information. This may result in incomplete, duplicate, or mismatched records, compromising the integrity and reliability of the combined dataset.

Also, validation of the data or files may fail due to incompatibilities between the source and destination entities. Performance of the one or more workflows may thus either be interrupted or fail due to validation errors. Further, when validation fails due to data or file incompatibilities, it can lead to a range of issues. For example, incompatibility of data may lead to an increase in the amount of time and resources spent on manual data cleaning and reformatting. Also, in some instances, it is possible that incompatible data may bypass validation checks or quality control measures, allowing erroneous information to propagate through the entities or system undetected. This may lead to a cascade of errors in subsequent processing steps, potentially amplifying the impact of the initial incompatibility.

Further, in some instances, it may be possible that the entities follow common policies, business rules, formats, and protocols, however, the data or file compatibility could still be compromised due to the occurrence of different events or conditions. For example, an application may send data to another application in accordance with predefined rules or protocols. However, in case the rules or protocol are modified for only one of the applications, for example, due to maintenance activities or software updates, the application may send data following updated rules and protocols. For instance, the format or structure of the data being sent by the application may change, however, the essence of the data may remain unchanged. That is, it may be possible that the application communicates data with a different format as compared to the format that was being used before the maintenance activities or updates. In such a case, the data may become incompatible with the other application, for which the rules or protocol were not modified, even if the essence or semantics of the data remains unchanged. Thus, the other application may either be unable to process such incompatible data or generate erroneous results or outcomes.

Furthermore, in some cases, changes in format of the data could also occur due to unauthorized or unintended events, for example, data breaches or malicious activities. Such changes may be done, for example, to make the data being exchanged between entities incompatible with each other and, thereby, hinder or disrupt the exchange of data and communications between the entities. For instance, in a network, entities or resources may be recognized or identified based on the data, such as name or addresses associated with them. In the network, the resources may generally be configured to communicate with other recognized resources. In case of changes in the data, or format thereof, associated with a resource, that resource may become unrecognizable or may be identified as unauthentic or invalid. Such instances may cause a failure of, or at least hinder, the communication between the resources. As such failures may hinder or disrupt communications and data exchanges, it may be possible that the network may no longer remain functional or operational. Therefore, if data becomes incompatible, operations and smooth flow of information may be hindered or disrupted. Such disruption can also cause delays and potentially damage relationships between the entities involved. Therefore, it is possible that the data, and/or format thereof, being communicated between entities may be, or become, incompatible with respect to each other. That is, the data that may be compatible or processable by one entity, may not necessarily be acceptable or processable by another entity. Thus, the extraction and processing of data between different systems, platforms, and applications face multiple challenges.

The present subject matter relates to techniques for file record validation and transformation of the contents of the file record. According to one example, a file record may be received for validation thereof. In one example, the file record may be a data file received from a user. In another example, the file record may be content derived from the data file. The file record may include a plurality of data descriptors, each having one or more data elements associated therewith. The data descriptors may be, for example, labels, identifiers, or attributes that may indicate a characteristic about the one or more data elements associated therewith. In some aspects, data descriptors may take various forms, for example, field names, column headers, tags, or metadata entries, depending on the implementation. One example of a data descriptor may be a column header or tag indicating "first name" and the one or more data elements may be records or values associated with the "first name". That is, the data elements may represent specific values, attributes, or instances of data that correspond to particular data descriptors.

In response to receiving the file record, a reference specification may be obtained. The reference specification may indicate a plurality of valid data labels and a plurality of valid data points. Each of the plurality of data points may be associated with, or classified into, a data label from amongst the plurality of data labels. In one example, the reference specification may be a set of rules or information indicating the allowable or valid data labels and valid data points for each of the valid data labels. The data labels may be, for example, descriptors or tags providing context and meaning to associated data points. The data labels may also indicate distinct attributes or characteristics of the data points being classified or organized. Further, the data points may be specific values, examples, or rules associated with a particular data label. For example, the data points may include exemplary values, that correspond to a data label, or rules indicating valid or allowable types of data for that data label. For instance, one of the data labels may be "name" and the data points may be exemplary values for the data label "name". The exemplary values may be indicative of different characteristics or attributes for data points allowable or valid for that data label. For example, the exemplary values may indicate format, data type, character length, and the like for data points that may be valid for that particular data label. Thus, for different types of data labels, the data points may indicate valid or allowable records for corresponding data labels. In one example, the reference specification may be derived based on a configuration file. The configuration file may indicate the valid data labels and allowable data points corresponding to each of the valid data labels.

Once the reference specification is obtained, a semantic assessment may be performed between the received file record and the obtained reference specification. The assessment may be performed to determine one or more data descriptors, from amongst the plurality of data descriptors, that may be semantically conforming or similar to one data label from amongst the plurality of data labels. Based on the assessments, one or more semantically conforming pairs may be determined. For example, a pair may include one data descriptor and the one data label semantically conforming with that one data descriptor. Similarly, more semantically conforming pairs could also be determined or identified.

Further, for each of the semantically conforming pairs, it may be determined whether an aspect of one or more data elements, associated with that data descriptor, conforms with a correlated aspect associated with each of the plurality of data points linked with the one data label. In one example, the aspect may be the format of each of the one or more data elements. The corresponding aspect may thus be a format of each of the plurality of data points linked with that one data label. For example, it may be determined whether the one or more data elements of the one data descriptor have a format which conforms with the format of the data points linked with that one data label.

In case it is determined that the aspects are different, a data modification workflow may be triggered. The data modification workflow may modify or transform the aspect of the one or more data elements based on the correlated aspect, so that the aspect of the one or more data elements conforms with the correlated aspect of the one or more data points of the reference information or the configuration file. The file record may thus be modified to include the one or more data elements having the transformed aspect in accordance with the configuration file.

The present subject matter provides techniques for file record validation. According to the present subject matter, a semantically conforming data label may be determined for one or more data descriptors of a file record. As discussed above, the data label may include data points indicating exemplary values or rules for valid or allowable data associated with that data label. By establishing a semantic relationship between the data descriptors in the file record and the valid data labels in the reference specification, effective mapping and validation of incoming data, i.e. file record or contents thereof, may be implemented. For example, once a data label semantically conforming with a data descriptor is determined, the data elements of that data descriptor may be validated by assessing whether they comply with the exemplary values or rules indicated by the data points of the data label. The data elements may be compared against these exemplary values or rules to determine if they meet, for example, the expected format, structure, or content requirements. The approach may thus facilitate validation of data elements by leveraging semantically conforming data labels and their associated data points, allowing a comprehensive assessment of whether the file record's contents align with the expected standards or requirements defined or indicated by the reference specification.

Further, the data or file records may be validated with improved accuracy by utilizing semantic relationships between data descriptors and reference data labels. Semantically assessing file records against the reference specification may allow for effective mapping and validation of incoming data, even when data descriptors may not exactly match the data labels. By determining semantically conforming pairs between data descriptors and valid data labels, variations in naming conventions or structures can be flexibly handled. Further, greater adaptability may be achieved in processing varied data structures using exemplary values and rules, which may allow for more flexible handling and validation of diverse data formats and content types.

Furthermore, when aspects of data elements do not conform to the correlated aspects of valid data points, the data modification workflow is triggered to transform the non-conforming aspects of data elements to match the expected correlated aspect. In one example, the aspect and the correlated aspect may be format or structure of data elements and data points, respectively. The data modification workflow, in one example, may modify the aspect of the one or more data elements to conform with the correlated aspect of the one or more data points of the reference information. The file record may thus be modified to include the one or more data elements having the valid aspect in accordance with the configuration file. By modifying the file record to include transformed data elements, the data may become compatible with, for example, downstream system, applications, processes, platforms, or databases without losing its essential meaning or content. As the reference information may be a set of rules or information indicating the data labels and data points acceptable or valid for, for example, systems, platforms, devices, or applications, modifying the file record in accordance with the reference information may enhance the compatibility of the file record with the systems, platforms, devices, or applications, and improve chances of validation of the file record.

Further, by preprocessing and transforming the incoming data, for example, the file records, to ensure compatibility before providing it to systems, platforms, devices, or applications or for further processing, the present subject matter may assist in preventing, or at least reducing, errors and unexpected behaviours or crashes that possibly arise due to incompatible data. For example, enhancing the compatibility may reduce the validation errors that used to either delay or interrupt downstream workflows or data processing due to data incompatibility issues. As a result, the execution of workflows and data processing may become faster as the delays or interruptions may be reduced. Also, the computing resources may not be utilized unnecessarily for processing incompatible data or files. Such a proactive approach to enhance data compatibility may significantly reduce the time and resources spent on manual data cleaning, reformatting, and error resolution.

Also, transformation of the file record may ensure alignment with the required specification, i.e., the reference specification, thereby reducing data interpretation errors as compatibility of the modified data, or file record, may be enhanced for being appropriately processed by the downstream entities. Enhancing the compatibility of the data may prevent misinterpretation or mishandling of data, thereby preventing incorrect or inaccurate computations and generation of erroneous or nonsensical results. Enhancing data compatibility may thus improve overall efficiency and accuracy in interpretation and handling of data. Also, enhanced data interpretation and handling may help in generation of accurate visualizations, dashboards, graphs, and the like that may be assist in derivation of accurate insights and thereby determine appropriate outcomes and decisions.

Additionally, the use of a reference specification derived from a configuration file provides a flexible and maintainable solution to define valid data labels and data points, thereby providing a solution to easily update and manage data validation rules as requirements change over time, without needing to modify any core validation logic or complex algorithm. For example, the reference information may be modified to adapt to dynamically changing requirements of entities, for example, systems, platforms, devices, or applications. By simply modifying the reference information, the incoming data, for example, file records may be dynamically validated and, if required, modified in accordance with the modified reference information. Thus, the present subject matter provides a simple, adaptable, and flexible solution that may allow validation and modification of the incoming data based on the changing requirements.

Further, validation and modification, based on reliable reference information derived from a sample or configuration file, may enhance data integrity and security. For example, the reference specification, being derived from a sample or configuration file, may include the valid data labels and valid data points, as discussed above. The reference information may thus be reliable information on the basis of which the incoming data may be validated and modified, if required. If the incoming data is modified maliciously to disrupt communication between entities, the incoming data may be validated and modified, if required, to make the incoming data compliant with one or more entities, for example, the downstream systems, processes, databases, platforms, or applications. As a result, communication between the one or more entities may remain secure and unaffected by unintended or malicious data alterations. Also, as the incoming data may be validated against the reference specification and modified if necessary, hindrances, disruptions, or delays in data exchange may be reduced. The robust validation mechanism may thus contribute to maintaining the overall reliability and efficiency of data exchange processes across various entities.

The semantic assessment and transformation capabilities may also help in mitigating issues arising from changes in data formats, for example, due to software updates, maintenance activities, or even unauthorized modifications. By focusing on the semantic meaning of data rather than strict format adherence, the solution may adapt to evolving data structures while maintaining data integrity and interoperability between different entities in a network or computing environment.

The above techniques are further described with reference to FIGS. 1A to 10. It would be noted that the description and the figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIGS. 1A to 1D illustrate block diagrams of a computing environment 100, according to an example implementation of the present subject matter. FIGS. 1A to 1D may be discussed in conjunction with each other.

The computing environment 100 may be an environment having multiple entities that may be communicably coupled with each other, for example, to exchange data, files, and/or signals. In one example, the computing environment 100 may include a system 102 having a processor 104, a data source 106, a configuration file source 108, and a destination 110. The system 102, the data source 106, the configuration file source 108, and the destination 110 may be communicably coupled with each other. The coupling may be, in one example, direct coupling, as illustrated in FIG. 1A. For example, the coupling may be wired or wireless and through one or more networking devices (not shown), such as switches, routers and/or gateways. The one or more networking devices may facilitate exchange of data, files, signals, and/or instructions between the system 102, the data source 106, the configuration file source 108, and the destination 110.

In another example, the coupling may be through a communication network 112. The system 102, the data source 106, the configuration file source 108, and the destination 110 may exchange data, files, signals, and/or instructions through the communication network 112. For instance, the system 102, the data source 106, the configuration file source 108, and the destination 110 may be distributed across different locations and/or platforms and may be communicably coupled over the communication network 112 to assist in inter-communications and exchange of data, files, signals, and/or instructions. Examples of the communication network 112 may include, but are not limited to, LAN, WAN, the internet, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 112 may include various network devices or entities, such as transceivers, gateways, switches, and routers. In an example, the communication network 112 may include any communication network that uses any of the commonly used protocols, for example, Hypertext Transfer Protocol (HTTP), and Transmission Control Protocol/Internet Protocol (TCP/IP).

Figure 1B:
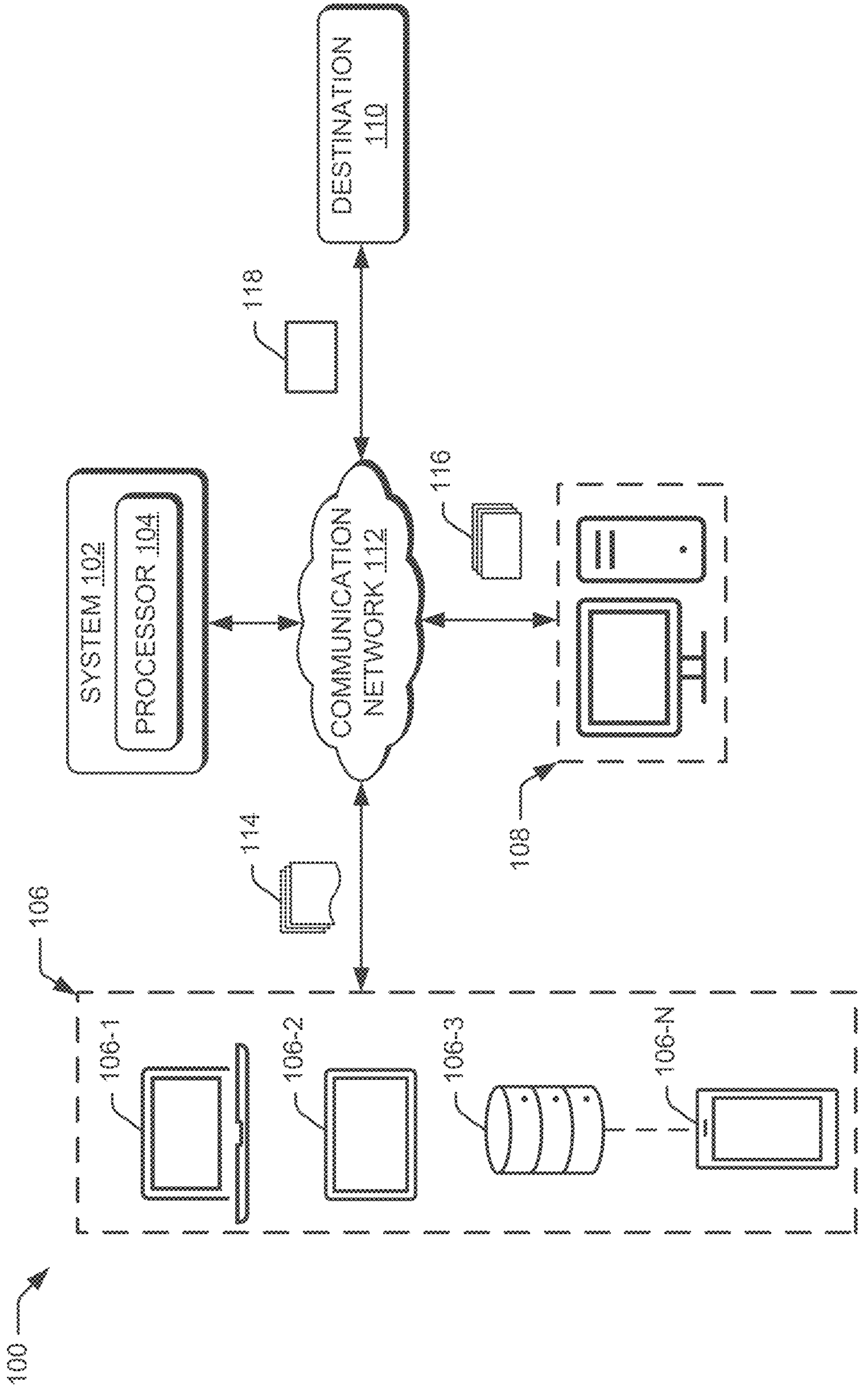
Figure 1C:
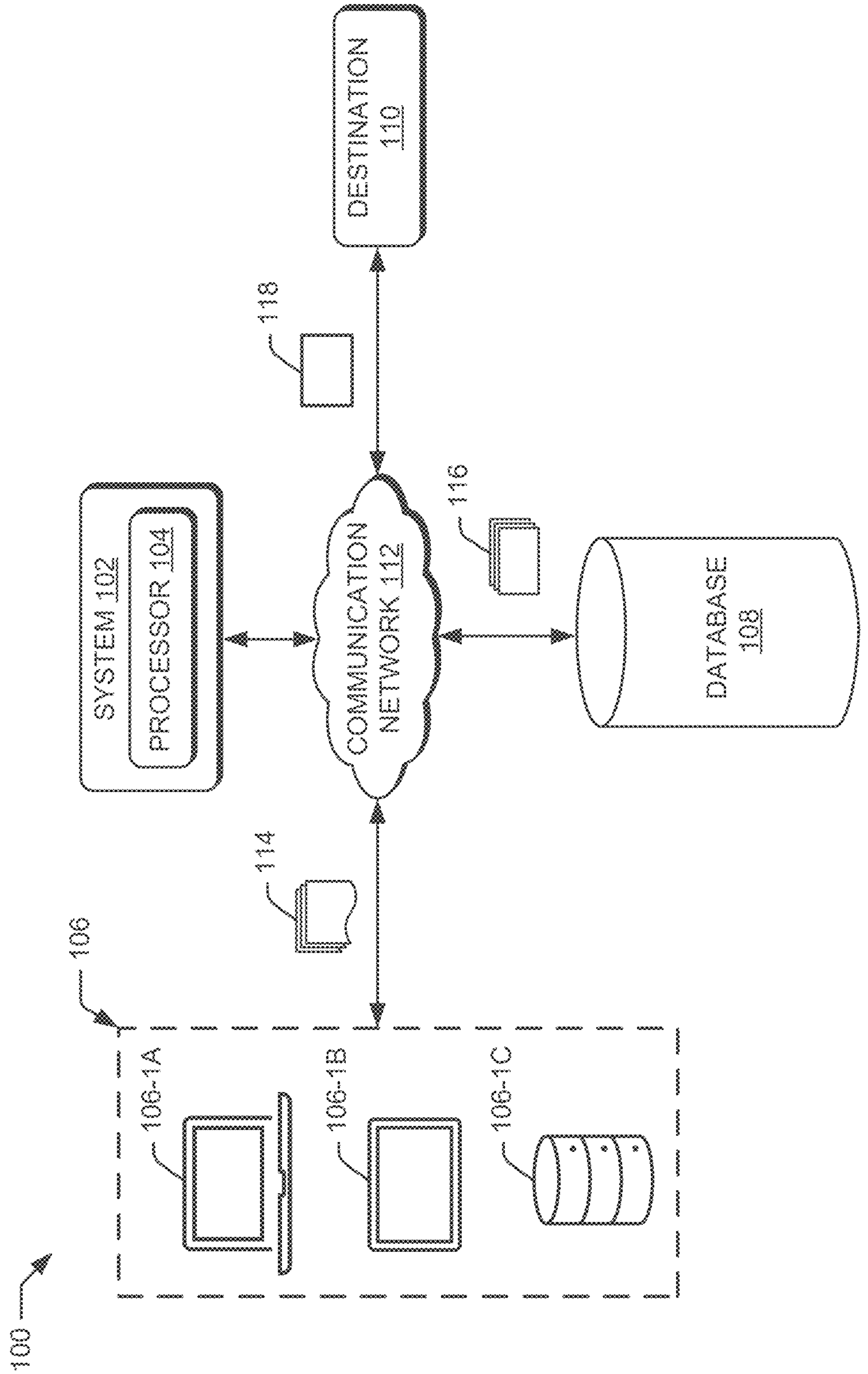

In one example, the data source 106 may be a source or collection of data. The data source 106 may actively transmit or generate data, or it may store data that can be accessed by authorized entities, for example, the processor 104. The data source 106 may include, in one example, one or more devices. Examples of the one or more devices may include a computing system 106-1, a tablet 106-2, a database 106-3 . . . , and a mobile 106-N, as illustrated in FIG. 1B, and N being a natural number. In another example, the data source 106 may include one or more software applications, platforms, web pages or websites, cloud storage platforms, social media platforms, content generation and management tools, and the like. In one example, the data source 106 may be associated with one or more users. In such a case, the data source 106 may store data provided by the one or more users. The one or more users may be, for example, individual users that may send the data from the data source 106 to the processor 104 or the destination 110. In another example, the data source 106 may be associated with one or more users linked with one or more organizations. Such users may be, for example, administrators, developers, engineers, system or data maintenance professionals, and the like. In such a case, the one or more devices may store and/or send data associated with the one or more organizations. Such users, in one example, may also be customers or clients of the one or more organizations.

In one example, the data source 106 may store and/or send data in the form of one or more files. The data stored in the one or more files, and the one or more files themselves, may be interchangeably referred to as a file record 114. That is, the file record 114, in one example, may be one or more files stored in, and/or sent by, the data source 106, whereas, in another example, the file record 114 may be one or more records or data stored in the one or more files. In yet another example, the file record 114 may also be data about the one or more files stored in the data source 106. Thus, the file record 114 may be the one or more files, the data stored in the one or more files, and/or data about the one or more files that may be stored and/or transmitted by the data source 106.

Figure 2:
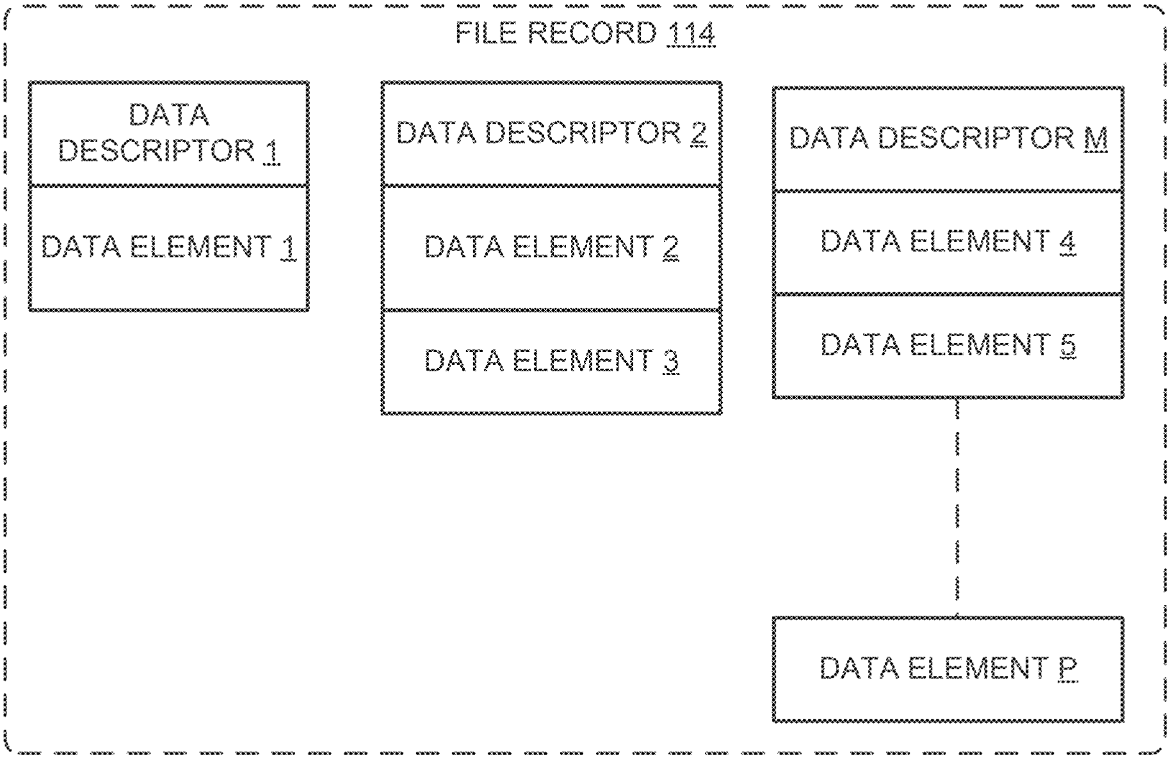
FIG. 2 illustrates a block diagram of a file record, according to one example implementation of the present subject matter.

In one example, the file record 114 may include a plurality of data descriptors, each having one or more data elements associated therewith, as illustrated in FIG. 2. FIG. 2 illustrates a block diagram of the file record 114, according to one example implementation. In one example, as illustrated in FIG. 2, the file record 114 may include the plurality of data descriptors 1 to M, where M is a natural number. Each of the data descriptors 1 to M may have one or more data elements associated therewith. For example, the data descriptor 1 may have a data element 1 associated therewith, and the data descriptor M may have data elements 4 to P associated therewith, where P is a natural number.

The data descriptors may be, for example, labels, identifiers, or attributes that may characterize, describe, or categorize a particular type or piece of information or data elements. The data descriptors may provide context or meaning to associated data elements. In some aspects, the data descriptors may provide information about the nature, type, format, or structure of the associated data element. For example, a data descriptor may indicate whether the corresponding data element is numeric, alphabetic, alphanumeric, or of another type. In some cases, the data descriptor may also provide information about the format, range, or constraints of the data element. These descriptors may be used to categorize, organize, or process the data elements. In some aspects, data descriptors may take various forms, such as field names, column headers, tags, or metadata entries, depending on the specific implementation. While in other aspects, the data descriptors may be implicit and indicate properties, characteristics, attributes, and the like about the data elements. Further, the one or more data elements may be considered the actual content or records that populate a database, spreadsheet, or other data storage format. Examples of data elements may include, but are not limited to, text strings, numerical values, dates, binary data, arrays or lists, geolocation data, encrypted data, and other types of information.

In one example, the one or more data elements may be unique addresses or identifiers associated with resources or devices of a network. Examples of the data elements may include, but are not limited to, unique device names, Internet Protocol (IP) addresses, and Media Access Control (MAC) addresses. As the data elements are identifiers for the resources or devices, in this example, the data descriptor associated with such data elements may describe, for example in text, that the data elements are identifiers of the resource. For example, the data descriptor may indicate "resource identifier". Thus, the data descriptor "resource identifier" may have associated therewith the unique identifiers as the data elements. Similarly, different examples of the data descriptors and data elements associated with such data descriptors may be possible, where the data descriptors may indicate one or more characteristics or attributes about the data elements. For example, if the data elements are names of users, the data descriptor may be "name" having values of the names (i.e., actual names of the users) as data elements. For example, the data elements may be, "Jack", "Ken Adams", "Scott James Arnold", and "A. Cornell". In another example, the data elements may be date and the data descriptor may thus indicate "date". Similarly, different examples of data descriptors and data elements may exist.

Figure 3:
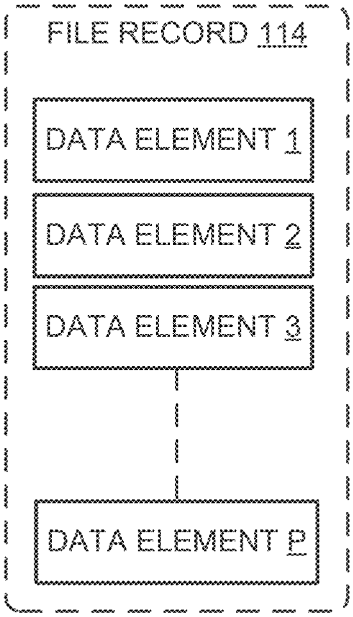
FIG. 3 illustrates a block diagram of the file record, according to another example implementation of the present subject matter.

The above-discussed examples indicate that the data descriptor may be explicitly indicated in the file record 114 in association with corresponding data elements. However, it may also be possible that the data descriptors may be implicit and obvious from the characteristics of the data elements. For example, it may be possible that the file record 114 explicitly includes one or more data elements, as illustrated in FIG. 3, and the data descriptors may be one or more characteristics, properties, or attributes understood based on the data elements, and are not explicitly included in the file record 114. For example, if data elements are numbers, the data descriptor may be understood, or be obvious, from characteristics or attributes of the data elements, i.e., numerical data. Similarly, if the data elements are a combination of alphabets and numbers, the data descriptor for such data elements may be alphanumeric, obvious or understood from the property of the data elements. In another example, if the data elements are dates in MMDDYYY format, the data descriptor may describe that the data elements are date and format of the date, thus describing or being characteristic or attribute of the data elements. Thus, the data descriptors, in one example, may be understood as the one or more characteristics, properties, or attributes of the data elements and that may be implicit and understood from characteristics or attributes of the data elements. Therefore, as illustrated exemplarily in FIGS. 2 and 3, the file record 114 may include a plurality of data descriptors, each having one or more data elements associated therewith, and where the data descriptors may either be explicitly or implicitly associated with the data elements.

Figure 4:
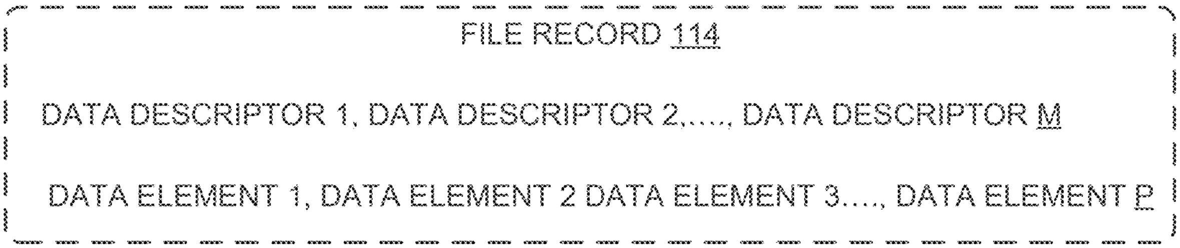
FIG. 4 illustrates a block diagram of the file record, according to another example implementation of the present subject matter.

Further, though it has been illustrated in FIG. 2 that the data elements may be in a tabular format where the data descriptors may be column labels or headers. Other examples and formats may also be possible. For example, the data elements may be in form of an array in the file record 114, as illustrated in FIG. 3, and the data descriptors may be implicitly associated with each of the data elements. In yet another example, the data elements and the data descriptors, both, may be in form of an array, as illustrated in FIG. 4, where each of the data descriptors may have one or more data elements associated therewith. For example, data element 1 may be associated with data descriptor 1, data elements 2 and 3 may be associated with data descriptor 2, and data element P may be associated with data descriptor M, as illustrated in FIG. 4. Though it has been illustrated that the data descriptors may be explicitly indicated, however, it may also be possible that the array only includes the data elements, and the data descriptors may be characteristics or attributes of the data elements that may be implicit and understood or obvious from the data elements.

Further, as illustrated in FIGS. 1A to 1D, the computing environment 100 may include the configuration file source 108. In one example, the configuration file source 108 may be a source of configuration data. In one example, the configuration file source 108 may store and/or send the configuration data in the form of one or more files. In another example, the configuration file source 108 may store and/or send the configuration data. The configuration data and the configuration file having configuration data may hereinafter interchangeably be referred to as a configuration file 116.

In one example, the configuration file 116 stored and/or generated by the configuration file source 108 may be a template or a sample file indicating acceptable, allowable, or valid data, types of data, format of data, and the like, suitable or preferred for the destination 110. For example, the configuration file 116 may indicate a plurality of valid data labels and a plurality of valid data points. The configuration file 116 may thus indicate a set of rules, guidelines, or information indicating the allowable or valid data labels and valid data points for each of the valid data labels. The data labels may be, for example, descriptors or tags providing context and meaning to associated data points. The data labels may also indicate distinct attributes, characteristics, or properties of the valid data points. Further, the data points may be values, examples, or rules associated with a particular data label. For example, the data points may include exemplary values, that correspond to a data label, or rules indicating valid or allowable types of data for that data label. For instance, one of the data labels may be "name" and the data points may be exemplary indicating one or more names. The exemplary values may be indicative of different characteristics or attributes for data points allowable or valid for that data label. For example, the exemplary values may indicate format, data type, character length, and the like for data points that may be valid for that particular data label. Thus, the configuration file 116 may indicate, for different types of data labels, the data points valid or allowable for corresponding data labels. Thus, the configuration file 116 may indicate the valid data labels and allowable data points for each of the valid data labels. The configuration file 116 may specify a set of acceptable data labels and define the permissible format, values, and/or ranges of values that can be associated with each of those labels. The configuration file 116 may serve as a reference or guideline for structuring and validating data. Thus, the content of the configuration file 116, or the configuration file 116 itself, may be referred to as reference specification indicating rules and information about acceptable, allowable, or valid data, types of data, format of data, and the like.

Further, the configuration file source 108 may be, in one example, one or more workstations 108, as illustrated in FIG. 1B. The one or more workstations 108 may be associated with one or more users. Examples of the users may include, but are not limited to, engineers and administrators associated with one or more organizations. In one example, the one or more users can also be independent users or customers. The one or more workstations 108 may include, in one example, one or more laptops, desktop computers, mobile phones, and the like. Other examples of workstations may also be possible. In one example, the configuration file 116 may be received, by the system 102 or the processor 104, from the one or more workstations 108. The one or more workstations 108 may enable the one or more users to submit the configuration file 116 via, for example, one or more interactive graphical user interfaces, software applications, or webpages being rendered by the one or more workstations 108.

In another example, the configuration file source 108 may be a database 108 having the configuration file 116, or content thereof, stored thereon. In one example, the database 108 may receive the configuration file 116 from the one or more users through the one or more workstations 108. In another example, the configuration file 116 can also be received from the data source 106. In another example, the configuration file 116 may be received by the database 108 from one or more software applications, platforms, and webpages. Further, the database 108 may include, for example, a set of storage devices capable of storing data and information, for instance, the configuration file 116. The set of storage devices may be virtual storage devices, physical storage devices, a cloud-based storage service, or a combination thereof. For example, the database 108 may be any repository or storage unit implemented by physical, logical, and/or virtual storage devices. In one example, the database 108 may include a set of physical storage devices. In another example, the database 108 may include virtual storage devices being implemented on physical storage devices. In another example, the database 108 may include one or more physical or logical storage units that may either be located at the same location or distributed geographically. In another example, the database 108 may be implemented over a cloud-based storage service.

Further, in one example, the computing environment 100 may include the system 102, having at least the processor 104, for file record validation. In one example, the system 102 may assist in validating the file record 114 received from the data source 106, as will be discussed. In one example, the system 102 may also assist or facilitate modification of the file record 114 to comply with the reference specification and enhance validation and/or compliance of the file record 114 with respect to the destination 110, as will be discussed. In one example, the system 102 may monitor the exchange of file records between data source 106 and the destination 110 for validating and modifying, if required, the file records. In one example, the system 102 may also cause generation of a modified file record 118 for the destination 110, as will be discussed. To elaborate on the functionality of the system 102 for file record validation, reference is made to FIGS. 5 and 6.

In one example, the system 102 may be implemented as a set of one or more hardware devices or modules to monitor, facilitate, and/or control validation of file records, such as the file record 114 being exchanged between the data source 106 and the destination 110. For example, the system 102 may be implemented as a set of one or more hardware devices, comprising the processor 104. In this example, the set of one or more hardware devices may be communicably coupled with the communication network 112, and/or the data source 106, the configuration file source 108, and the destination 110. Examples of the set of one or more hardware devices may include, but are not limited to, servers, computing systems, gateways, access points, and network nodes or networking devices.

In another example, the system 102 may be implemented as a set of computer-executable instructions that may interact with the data, files, and/or signals being exchanged between the data source 106 and the destination 110. Examples of the system 102, according to this example, may include, but are not limited to, software applications, cloud-based platforms, platforms hosted or accessible via the internet, virtual gateways, firewalls, data pre-processors, Platform as a Service (PaaS), and Software as a Service (Saas).

In yet another example, the system 102 may be implemented as a combination of the one or more hardware devices and the set of computer-executable instructions. In this example, the set of computer-executable instructions may be executed by the processor 104 to implement monitor, facilitate, and/or control validation of file records, such as the file record 114 being exchanged between the data source 106 and the destination 110.

Further, the computing environment 100 may include the destination 110 configured to receive the modified file record 118. The destination 110 may include one or more hardware devices, software applications, platforms, or a combination thereof. For example, the destination 110 may include one or more software applications or platforms that may process or transform the modified file record 118 for generation of one or more outcomes. Examples of such outcomes may include, but are not limited to, dashboards, user interfaces, tables, graphs, heat maps, and machine-readable documents, files, or reports. In another example, the destination 110 may include one or more networking devices that may manage, facilitate, and/or control communication of the modified file record 118 to other systems, applications, and/or platforms communicably coupled with the networking devices. In yet another example, the destination 110 may include storage systems that may receive and store the modified file record 118 for later retrieval or analysis. For instance, data visualization tools may obtain and process the modified file record 118 to create interactive visualisations, such as charts, graphs, or heat maps; or machine learning algorithms or artificial intelligence systems may analyze the modified file record 118 to identify patterns or make predictions. In another example, the destination 110 may include Enterprise resource planning (ERP) systems that may integrate the modified file record 118 into various business processes. In yet another example, the destination 110 may include Automated reporting systems that may generate reports based on the modified file record 118 and/or generate dashboards to display key metrics derived from the modified file record 118.

Similarly, there may be other examples of the destination 110. Examples of the destination 110 may include, but are not limited to, one or more software applications or tools, servers, platforms, networking devices, data storage devices, databases, websites or webpages, email services or platforms, web browsers, coding platforms, and computing devices or systems. In one example, the modified file record 118 may be more suitable for the destination 110 as compared to the file record 114, as will be discussed below.

Figure 1D:
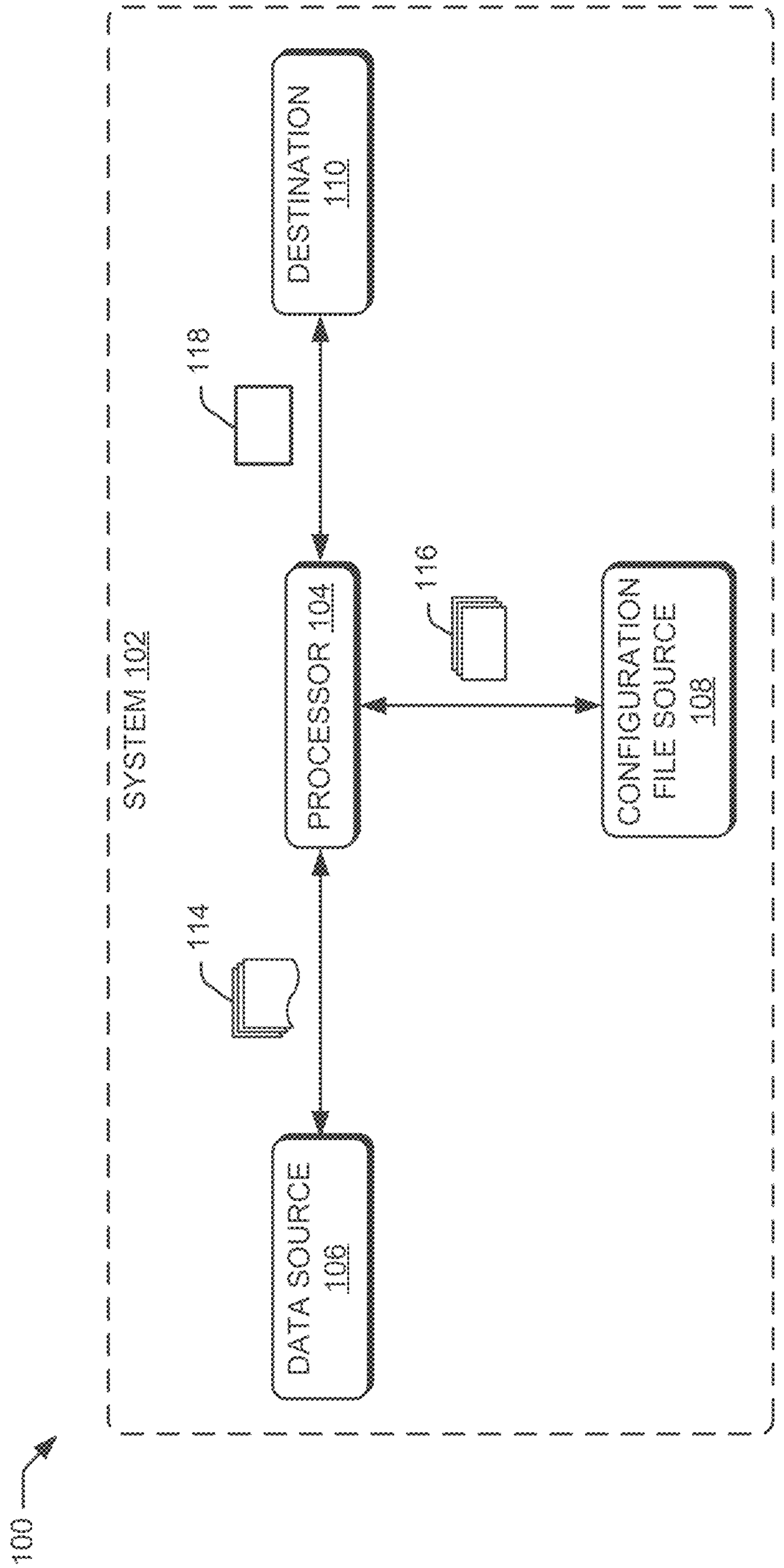

Further, though illustrated in FIGS. 1A to 1D that the data source 106, the configuration file source 108, and the destination 110 are communicably coupled with the system 102 and are external to the system 102, other architectures and implementations may also be possible. In one example, the data source 106, the configuration file source 108, and the destination 110 may be a part of the system 102, as illustrated in FIG. 1D. In this example, the data source 106, the configuration file source 108, and the destination 110 may be communicably coupled via the processor 104.

Different architectures and examples have been discussed above. However, such examples and illustrations are not to be considered as limiting in scope and nature. Other obvious architectures may also be possible where at least one data source 106 may be communicably connected to exchange data, files, and/or signals with the destination 110.

Figure 5:
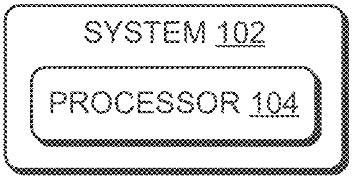
FIG. 5 illustrates a block diagram of a system, according to one example implementation of the present subject matter.

FIG. 5 illustrates a block diagram of the system 102, according to one example implementation of the present subject matter. FIG. 5 will be discussed in conjunction with FIGS. 1A to 4. In one example, the system 102, having the processor 104, may facilitate file record validation.

In one example operation, the processor 104 may obtain a reference specification indicating a plurality of valid data labels and a plurality of valid data points, where each of the plurality of data points may be classified into a data label from amongst the plurality of data labels. In one example, the processor 104 may obtain the reference specification in response to receiving a file record, such as the file record 114, for validation thereof. The file record 114 may include, in one example, a plurality of data descriptors, each having one or more data elements associated therewith.

Further, the processor 104 may perform a semantic assessment between the file record 114 and the reference specification to determine one or more data descriptors, from amongst the plurality of data descriptors, semantically conforming with one data label, from amongst the plurality data labels of the reference specification. For example, the processor 104 may determine the one or more data descriptors that may be semantically conforming with one data label. For instance, the processor 104 may determine that the data descriptor 1 and data descriptor M are semantically conforming with one data label, from amongst the plurality of data labels. That is, the processor 104 may determine that the data descriptor 1 semantically conforms with the one data label, forming a pair of semantically conforming data descriptor and data label, and that the data descriptor M semantically conforms with the one data label, forming another pair of semantically conforming data descriptor and data label. Similarly, the processor 104 may perform the semantic assessment to determine more data descriptors that may be semantically conforming with the data labels.

The processor 104 may then determine, for each semantically performing pair, whether an aspect of one or more data elements, associated with that data descriptor, conforms with a correlated aspect associated with each of the plurality of data points linked with the one data label. For example, the processor 104 may determine whether the format in which content of the one or more data elements, associated with data descriptor semantically conforming with the one data label, conforms with the format of the data elements linked with that one data label.

Based on the determination, the processor 104 may trigger a data modification workflow to cause modification of the aspect of the one or more data elements. For example, if the processor 104 determines that the aspect of the one or more data elements is not in conformity with the correlated aspect, the processor 104 may trigger the modification workflow. In one example, the modification workflow may be triggered by the processor 104 to transform the aspect of the one or more data elements based on the correlated aspect. For example, the format of the one or more data elements may be modified to comply with the format of the data points of the one data label.

In response to triggering of the data modification workflow, the processor 104 may modify the file record 114 to include the one or more data elements having the transformed aspect. For example, the file record 114 may be modified to include the updated one or more data elements. The file record 114, having the one or more data elements with the transformed aspect, may be referred to as the modified file record 118.

By detecting and transforming non-conforming data elements, the present subject matter ensures the compatibility of file records being exchanged between platforms without manual intervention. As a result, incompatible files or records may first be processed to improve their compatibility before any further processing and/or sharing is initiated. Such an approach not only reduces validation errors but also optimizes the utilization of computing resources. In some aspects, comparing the aspect of one or more data elements associated with a data descriptor to a corresponding aspect of data points linked with a semantically conforming data label may be beneficial for validating data consistency, compliance, and compatibility. The comparison may allow for the identification of discrepancies or inconsistencies between the received file record 114 and the reference specification. By examining aspects, for example, format, data type, character length, or other relevant characteristics, the processor 104 may determine whether the data elements in the file record 114 align with the expected structure defined in the reference specification. The comparison may help in maintaining data integrity, facilitating proper data interpretation, and ensuring compatibility with downstream processes or systems, such as the destination 110, that may have specific requirements. In cases where differences are detected, the processor 104 may initiate the data modification workflow to transform the aspect of the data elements to align them with the correlated aspect specified in the reference specification. Such an approach may enable flexible handling of diverse data inputs while maintaining adherence to predefined data standards or requirements. Further, to elaborate on the functionality of the system 102 for file record validation, reference is made to FIG. 6.

Figure 6:
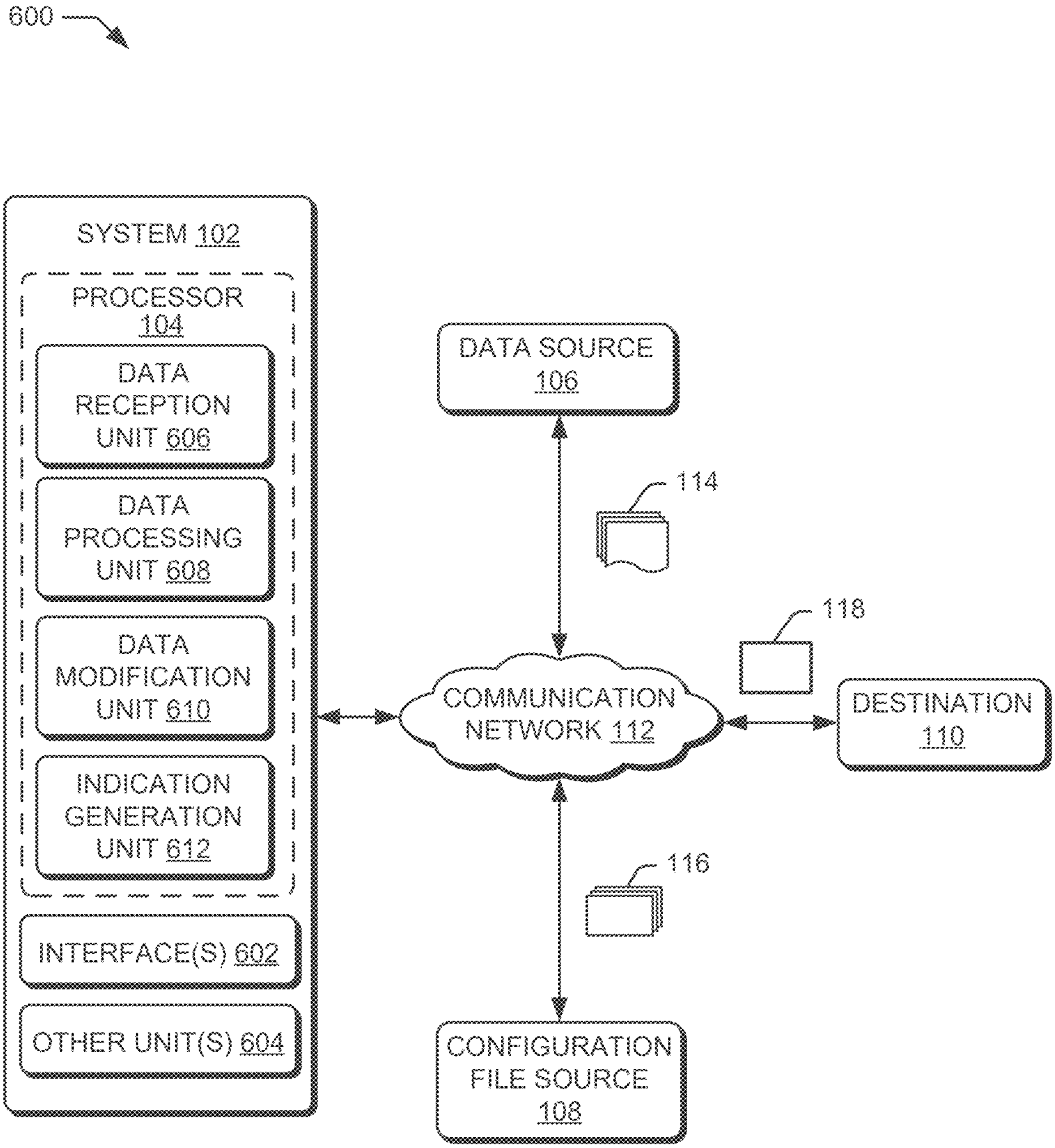
FIG. 6 illustrates a block diagram of a computing environment comprising the system, according to another example implementation of the present subject matter.

FIG. 6 illustrates a block diagram of a computing environment 600 comprising the system 102, according to another example implementation of the present subject matter. FIG. 6 will be discussed in conjunction with FIGS. 1A to 4 and the subject matter disclosed therewith shall be incorporated herein for reference, for the sake of brevity.

In one example, the computing environment 600 may be similar to the computing environment 100, as discussed in reference to FIGS. 1A to 1D. The computing environment 600 may be any environment having the system 102, the data source 106, the configuration file source 108, and the destination 110 communicably coupled with each other either directly or through the communication network 112. The computing environment 600 may thus be a network of such entities that may be communicably coupled with each other, for example, over the communication network 112.

The computing environment 600 may include the system 102, in one example, for validation of one or more file records, such as the file record 114. In one example, the system 102 may be configured to validate, or at least assist in validating, the file record 114 received from the data source 106. In one example, the system 102 may also modify, or at least assist in modification, of the file record 114 to comply with the reference specification and enhance validation and/or compliance of the file record 114 with respect to the destination 110. In one example, the system 102 may monitor the exchange of file records between data source 106 and the destination 110 for validating and modifying the file records. The validation and modification may be, in one example, to enhance the compatibility of the file records for the destination 110. In one example, the system 102 may cause generation of a modified file record, such as the modified file record 118, for the destination 110. In one example, the system 102 may pre-process the data, such as the file record 114, generated by the data source 106 and then facilitate sharing of the processed data, such as the modified file record 118, with one or more destinations, such as the destination 110. The modified file record 118, may be a version of the file record 114 with enhanced compatibility for the destination 110, as will be discussed.

In one example, the system 102 comprises the processor 104. The processor 104 may be implemented as a dedicated processor, a shared processor, or a plurality of individual processors, some of which may be shared. Examples of the processor 104 may include, but are not limited to, microprocessors, microcomputers, microcontrollers, digital signal processors, central processing units, state machines, Artificial Intelligence (AI) based processors, machine learning-based processors, deep learning-based processors, system on chip (SOC), processing circuitries including one or more modules or engines, and/or any other devices that manipulate signals and data based on computer-readable instructions, and/or any other devices.

In one example, the processor 104 may include one or more sub-processing units or engines. For example, the processor 104 may include the data reception unit 606, data processing unit 608, data modification unit 610, and indication generation unit 612. The units may be implemented as a combination of hardware and programming, for example, programmable instructions to implement a variety of functionalities of the units. In examples described herein, such combinations of hardware and programming may be implemented in several different ways. For example, the programming for the units or engines may be executable instructions. Such instructions in turn may be stored on a non-transitory machine-readable storage medium which may be coupled with the system 102 either directly or indirectly (for example, through networked means). In an example, it may also be possible that each of the units or engines includes a processing resource, for example, either a single processor or a combination of multiple processors, to execute such instructions. In one example, such instructions may be stored in a memory of other unit(s) 604 of the system 102. In other examples, the units or engines may be implemented as electronic circuitry.

The system 102 may further comprise, in one example, interface(s) 602. The interface(s) 602 may include a variety of software and hardware interfaces that allow interaction of the system 102 with other communication and computing devices, such as network entities, web servers, external repositories, and peripheral devices, such as input/output (I/O) devices. For example, the interface(s) 602 may communicably couple the system 102 with the data source 106, the configuration file source 108, and the destination 110. The interface(s) 602 may also enable the coupling of internal components of the system 102 with each other.

The system 102 may further comprise, in one example, other unit(s) 604. The other unit(s) 604 may include, in one example, a power supply unit, a communication unit, and a memory. The power supply unit may, for example, manage distribution or supply of electrical current within the system 102 for functioning of the system 102. Further, the communication unit may be, in one example, a wireless communication unit. Examples of the communication unit may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the communication unit may also include one or more antennas to enable wireless transmission and reception of data and signals. The communication unit may allow the system 102 to be communicably coupled with the data source 106, the configuration file source 108, the destination 110, and/or the communication network 112. Also, the communication unit may allow the system 102 to transmit and receive data, files, and/or signals. Further, the memory may include any computer-readable medium known in the art including, for example, volatile memory, such as Static Random-Access Memory (SRAM) and Dynamic Random-Access Memory (DRAM), and/or non-volatile memory, such as Read Only Memory (ROM), Erasable Programmable ROMs (EPROMs), flash memories, hard disks, optical disks, and magnetic tapes. In one example, the memory may store the data received, processed, or generated by the system 102 and/or the processor 104.

In one example operation, the processor 104, or the data reception unit 606, may receive a file record, such as the file record 114, for validation thereof. For example, the file record 114 may be received to be validated. As discussed above, the data source 106 may store and/or send the file record 114. In one example, the processor 104 may receive the file record 114 from the data source 106. In one example, the data source 106 may send the file record 114 to the processor 104. The data source 106 may send the file record, in one example, in accordance with a pre-defined configuration. For example, the data source 106 may send the file record 114 at regular intervals or after predefined durations. In another example, the file record 114 may be stored in the data source 106 and the processor 104 may receive the file record 114 by accessing the data source 106. The processor 104, in one example, may access the data source 106 when a new file record is available in the data source 106, for validating the new file record 114. In another example, the processor 104 may access the data source 106 in accordance with the pre-defined configuration to validate one or more file records at regular or predefined intervals.

In yet another example, the file record 114 may be received during an import operation, i.e., when the file record 114 is being imported to the destination 110 from the data source 106. In yet another example, the file record 114 may be received when the data source 106 transmits the file record 114. The import or transmission may be to perform one or more operations with the file record 114. Examples of such operations may include, but are not limited to, storing file record 114 in the destination 110, generating an outcome based on the file record 114, generating a visualisation based on the file record, sharing the file record with other software, platforms, or devices, communicably coupled with the destination 110, and the like.

In one example, the processor 104 may receive the file record 114 directly from the data source 106. In another example, the processor 104 may receive the file record 114 from the data source 106 via one or more other entities. Such entities may be, for example, software applications, graphical user interfaces, internet or cloud-based platforms, networking devices, and the like. For example, a user may upload or send the file record 114 from the data source 106 to a software, a webpage, or any graphical user interface. The processor 104 may receive the file record 114 from such entities.

As discussed above with reference to FIGS. 1A to 4, the file record 114 may include a plurality of data descriptors, each having one or more data elements associated therewith. The data descriptors may be, for example, labels, identifiers, or attributes that may characterize, describe, or categorize a particular type or piece of information or data elements. The data descriptors may provide context or meaning to associated data elements. In some aspects, the data descriptors may provide information about the nature, type, format, or structure of the associated data element. The data descriptors may either be explicitly or implicit in the file record 114.

Further, as discussed above with reference to FIGS. 1A to 4, the one or more data elements may be considered the content or records associated with data descriptors. The data elements may be record or values that may, for example, populate a database, spreadsheet, or other data storage format. Examples of data elements may include, but are not limited to, text strings, numerical values, dates, binary data, arrays or lists, geolocation data, encrypted data, and other types of information.

Figure 7A:
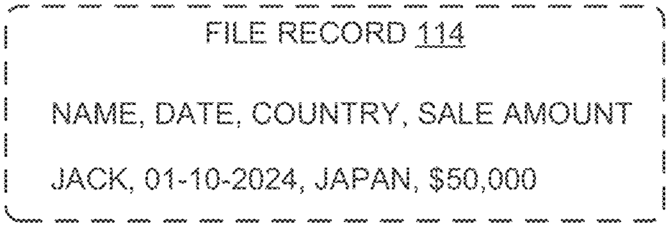
FIGS. 7A and 7B illustrate a block diagram of the file record, according to another example implementation of the present subject matter.
Figure 7B:

An exemplary file record 114 has been illustrated in FIGS. 7A and 7B. In one example, the file record 114 may be sales data for one or more employees of an organization and may be received by the processor 104 from the data source 106 that may be associated with the organization. Tags or labels like name, date, country, and sale amount may be the data descriptors and the content under each label may be the data elements associated with corresponding data descriptors. As discussed above, the data descriptors may indicate a characteristic, property, attribute, context, or meaning of the data elements. Similarly, the labels or tags indicate that the data elements may be name, date, country, and sale amount. In one example, the data descriptors may be explicitly indicated in the file record 114, as illustrated in FIG. 7A. However, in another example, the data descriptors may be implicit, as illustrated in FIG. 7B, and understood or obvious from the data elements. For example, it may be obvious that "01-10-2024" may be data, the date thus being data descriptor of "01-10-2024".

The file record 114 illustrated in FIGS. 7A and 7B are simple examples for illustration and understanding purposes. However, multiple other examples of file records are possible, some of which have been described above with reference to FIGS. 1A to 4. Thus, the processor 104 may receive the file record 114 having the plurality of data descriptors, each having one or more data elements associated therewith. The data descriptors may indicate various aspects, characteristics, attributes, properties, and the like about the data elements. The data descriptors may either be explicit or implicit.

In response to receiving the file record 114, the processor 104 may obtain a reference specification. In one example, the reference specification may be obtained from the configuration file source 108, as discussed above with reference to FIGS. 1A to 1D. As discussed above in one example, the configuration file 116 may serve as a reference or guideline for structuring and validating data. Thus, the content of the configuration file 116, or the configuration file 116 itself, may interchangeably be referred to as the reference specification indicating rules and information about acceptable, allowable, or valid data, types of data, format of data, and the like.

As discussed above with reference to FIGS. 1A to 1D, the configuration file 116 may be a template or a sample file indicating acceptable, allowable, or valid data, types of data, format of data, and the like. For example, the configuration file 116 may include a data set of valid data labels and a plurality of valid data points for each of the plurality of data labels. For example, if a data label is "name", the configuration file 116 may include multiple exemplary values of names. In another example, if a data label is "name", the configuration file 116 may include multiple exemplary rules for that data label. For example, a few of the rules may be that the data label "name" should only have alphabets, limitation in number of letters, exclusion of numbers or special characters, and the like. Similarly, if the data label is "date", the data elements may be at least one of exemplary values or date, ranges of date, and rule(s) for date. The rules may indicate, for example, an acceptable or valid format of date, say DDMMYYYY. Similarly, the configuration file 116, or the reference specification, may include multiple data labels, each having one or more data points associated or classified therewith. For example, names may be classified into the data label "name".

In one example, the processor 104, or the data reception unit 606, may obtain the reference specification from the configuration file 116 by accessing the configuration file source 108. For example, the processor 104 may access the configuration file source 108 in response to receiving the fire record 114 to obtain the reference specification.

In another example, the processor 104 may derive one or more rules or information, from the configuration file 116, indicating the valid data labels and the valid data points for each of the valid data labels. For example, the processor 104 may analyse and/or parse the configuration file 116, or the content thereof, to derive one or more rules or information (that may be referred to as the reference specification) indicating valid data labels and the valid data points. For example, if the configuration file 116 includes one or more sample valid data sets of the data labels and the data points, or their valid values, the processor 104 may parse such data set to derive the reference specification indicating the valid data labels, the valid data points for each of the labels, and one or more valid aspects associated with each of the plurality of valid data labels and the plurality of data elements. Examples of the one or more aspects may include, but are not limited to, context, meaning, format, and structure of the data labels and data points. Thus, instead of directly using the configuration file 116, the processor 104 may obtain or derive rules and/or information based on the content of the configuration file 116 to determine the valid data labels and the valid data points. Such rules and/or information may also be referred to as the reference specification. Thus, the reference specification may indicate the plurality of valid data labels and the plurality of valid data points for each of the data labels.

Further, the configuration file 116 may be received from the one or more users and may be stored in the configuration file source 108, as discussed above with reference to FIGS. 1A to 1D. However, in another example, the processor 104 may directly receive the configuration file 116 from the user. For example, the processor 104 may receive the configuration file 116 via a software, a platform, a webpage, or any other interactive graphical user interface. The processor 104 may then derive the reference specification, or consider contents of such file as the reference specification indicating exemplary valid data labels and valid data points. In yet another example, the processor 104 may directly obtain the reference specification from the user via the software, a platform, a webpage, or any other interactive graphical user interface, the reference specification indicating the valid data labels and valid data points for each of the data labels. Thus, the users may be provided with the flexibility to submit configuration file 116 and/or the reference specification with respect to which the user wants to validate the file record 114.

In one example, obtaining the configuration file 116 and/or the reference specification may be an initial one-time step in the process of validating subsequently received file records, until another/new configuration file 116 or reference specification is available or provided to the processor 104; or any instructions to use another configuration file 116 or reference specification is provided by one or more users, for instance, from user devices or the one or more workstations 108.

Further, once the file record 114 is received and the reference specification is obtained, the processor 104, or the data processing unit 608, may perform a semantic assessment between the file record and the reference specification. In one example, the semantic assessment or evaluation may be performed to determine one or more data descriptors, from amongst the plurality of data descriptors of the file record 114, that may be semantically conforming with one data label from amongst the plurality of data labels indicated by the reference specification. For example, the semantic assessment may be performed between each of the data descriptors and each of the data labels to identify or determine one or more data descriptors that may probably be semantically similar with a data label (i.e., one data label). Thus, a pair may be formed between that data label and each of the one or more data descriptors. For example, if data descriptor 1 is determined to be semantically conforming with a data label, a pair of data descriptor 1 and that data label may be determined. Similarly, if data descriptors 1 and 2 are determined to be semantically conforming with a data label, a pair of data descriptor 1 and that data label may be determined and another pair of data descriptor 2 and that data label may be determined. Similarly, the processor 104 may determine semantically conforming pairs based on the one or more data descriptors and the data labels. For example, for a data label indicating a point in time, date (a data descriptor in the file record 114, as illustrated in FIGS. 7A and 7B) may be semantically conforming. Similarly, for a data label indicating identity or identifier, name (a data descriptor in the file record 114, as illustrated in FIGS. 7A and 7B) may be semantically conforming. Thus, the data descriptors and the data labels having, for example, similar semantics, meaning, context, characteristics, values, properties, and the like, may be considered to be semantically conforming with each other.

In one example, the processor 104, or the data processing unit 608, may perform the semantic assessment by parsing each of the plurality of data labels, in the reference specification, to determine a semantic representation of each of the plurality of data labels. Further, the processor 104, or the data processing unit 608, may parse each of the plurality of data descriptors, in the file record 114, to determine a semantic representation of each of the plurality of data descriptors. The parsing may involve, for example, breaking down the text of each data label and data descriptor into individual words, phrases, tokens, and/or identifying meaningful units of information.

Further, in one example, the semantic representations may be vector representations of each of the data labels and the data descriptors, derived based on the parsing. In another example, the semantic representations may be spatial semantic representations representing each of the data labels and the data descriptors in a spatial format as points in a multi-dimensional space, the coordinates of which may be determined based on characteristics, features, or attributes of each of the data labels and the data descriptors. In yet another example, the semantic representation may be a spatial semantic representation of vectors, derived for each of the data labels and the data descriptors, in a multi-dimensional space. In such multi-dimensional spaces, the distance between the points or vectors may indicate a measure or extent of semantic similarity between the data labels and the data descriptors. For example, semantically similar data labels and data descriptors may be positioned closer together and have a lesser distance. Thus, based on the semantic representation of each of the plurality of data labels and the semantic representation of each of the plurality of data descriptors, the processor 104 may determine the one or more data descriptors semantically conforming with the one data label.

In one example, to determine the one or more data descriptors semantically conforming with the one data label, the processor 104 may compute a similarity score for quantifying a semantic conformity between the semantic representation of each of the plurality of data labels and the semantic representation of each of the plurality of data descriptors. The similarity score may be, in one example, the distance between each of the points or the vectors of the semantic representations. That is, a similarity score, indicating a distance, may be determined for each of the data labels and each of the data descriptors. In one example, the distance may be between pairs formed of data labels and data descriptors, such that each pair comprises a data descriptor and a data label at least once. For example, a pair may include point or vectors of (data descriptor 1, data label 1) and another pair may include points or vectors of (data descriptor 2, data label 1). Similarly, for each data label and each data descriptor, or vectors or point associated therewith, a pair may be formed and the distance, or similarity score, may be a distance between those points or vectors. The distance may indicate, for example, the pair of data label and the data descriptor, from amongst the plurality of data labels and data descriptors, that may have least distance therebetween.

In another example, each of the data descriptors may have a distance associated therewith, where the distance may indicate a distance between that data descriptor and each of the data labels. For example, a data descriptor 1 may have a distance associated therewith, indicating a distance between the data descriptor 1 and a data label 1. Similarly, a data descriptor 2 may have a distance associated therewith, indicating a distance between the data descriptor 2 and the data label 1. Similarly, each data descriptor may have a distance or similarity score associated therewith, indicating a distance from each of the data labels. The distance may indicate, for example, the one data label, from amongst the plurality of data labels, that may be closest to the data descriptor.

The processor 104 may then compare the distance or similarity score, determined for each of the data labels and each of the data descriptors, with a threshold similarity score to identify the one or more data descriptors having semantic conformity with at least one data label from amongst the plurality of data labels. In one example, the threshold similarity score may indicate a minimum distance required by the one or more data descriptors to be determined as semantically similar to the one data label. If the similarity score, for a data descriptor or a pair of data descriptor and the data label, is determined to be equal to or more than the threshold similarity score, the processor 104 may determine that data descriptor, or that pair of data descriptor and the data label, to be semantically conforming with that data label. However, if the similarity score is determined to be less than the threshold similarity score, the processor 104 may determine that that data descriptor, or that pair of data descriptor and the data label, may not be semantically conforming with that data label or each other. In one example, the threshold similarity score may be a modifiable score and may be defined by one or more users via the one or more user devices (illustrated as the data source 106) or the one or more workstations 108 using an interactive graphical user interface.

The above-discussed examples indicate different techniques for determining semantic representation and determining semantic conformity between different data descriptors and data labels. However, other techniques may also be utilized by the processor 104. For example, the processor 104 may utilize various natural language processing techniques to determine or generate the semantic representation of each data label and data descriptor. In some cases, the processor 104 may employ word embedding models, such as Word2Vec, GloVe, or FastText, to convert the parsed data labels and data descriptors into vector representations. These vector representations may capture semantic relationships between, for example, the words and phrases, allowing for meaningful comparisons between data labels and data descriptors. In some implementations, the processor may utilize topic modeling techniques, such as Latent Dirichlet Allocation (LDA) or Non-Negative Matrix Factorization (NMF), to identify underlying themes or topics within the data labels and data descriptors. The resulting topic distributions may serve as an additional form of semantic representation, providing insights into the thematic content of each label and descriptor.

Thus, based on the semantic assessment, the processor 104 may determine one or more semantically conforming pairs. Each of the pairs may include, for example, a data descriptor semantically conforming with a data label. The processor 104 may then determine, for each such semantically conforming pair, whether an aspect of the one or more data elements, associated with the data descriptor in that pair, conforms with a correlated aspect associated with each of the plurality of data points linked with the one data label, i.e., the data label in that pair. In one example, the aspect of the one or more data elements may be format of the one or more data elements. The corresponding aspect may thus be the format of each of the one or more data points.

As discussed above, the data points may indicate different characteristics, exemplary values, or rules allowed or valid for a data label. In one example, one such characteristic or aspect may be valid format indicated by the data points. Thus, in one example, to determine whether the aspect (for example, format or structure) of the one or more data elements conforms with the corresponding aspect of each of the data points, the processor 104 may analyze the one or more data elements with respect to each of the data points. For example, the processor 104 may analyze or parse text structures, syntax, type, style, spacing, presence of punctuations, and the like to determine whether the one or more data elements have the aspect in conformity with the correlated aspect of each of the data points. The processor 104, in other example, may utilize any know techniques, comparison tools or software, scripts, set of programs, platforms, and the like to compare the aspects and determine conformity or difference therebetween. The processor 104 may also utilize a character-by-character-comparison algorithm to determine whether the aspect conforms with the correlated aspect.

Further, if the processor 104 determines that the aspect conforms with the correlated aspect, the file record 114 may be determined to comply with the reference specification. However, if the processor 104 determines that the aspect is different than the correlated aspect, the file record 114 may be determined to be non-compliant with the reference specification. The processor 104 may thus determine to trigger a data modification workflow to cause modification of the aspect of the one or more data elements.

In one example, the data modification workflow may be a process triggered by the processor 104, or the data modification unit 610, to cause modification of the aspect of the one or more data elements. In one example, the modification may be to transform the aspect of the one or more data elements based on the correlated aspect. In one example, the processor 104, or the data modification unit 610, may trigger a translator or a transpiler that may transform the aspect of the data elements in such a manner that the aspect complies with the correlated aspect. In another example, the reference specification may be a style sheet (for example, CSS) defining valid data labels and data points indicating valid rules, values, formatting, and other aspects as discussed above. The data modification workflow may apply such a style sheet to the file record 114, or the data elements, to modify the aspect of the data elements for compliance with the correlated aspect indicated by the style sheet. Thus, the data modification workflow may use the reference specification, or the configuration file 116, as the template and basis for modifying the aspect of the one or more data elements. In another example, the data modification workflow may simply copy the formatting style indicated by the data points and apply the formatting style to the one or more data elements for compliance with the correlated aspect. In yet another example, the data modification workflow may create macros based on the data points and may be applied to the data elements so that the aspect of the data elements complies with the correlated aspect of the data points.

Similarly, other known techniques may also be utilized or triggered by the processor 104 to modify the aspect of the one or more data elements. For example, the data modification workflow may include triggering of libraries or data or text processing scripts that may use a set of programs to process the data elements for modifying the aspect. Similarly, multiple known techniques, software, tools, and the like may be utilized to modify the aspect of the data elements. In yet another example, triggering of the data modification workflow may include triggering of trained models. For example, a trained large language model (LLM)

may be used for detecting conformity of the aspects and modifying the aspect of the data elements with respect to the correlated aspect.

Consider an example of a file record having a date, as a data descriptor, that has multiple entries associated therewith in DDMMYYY format. Based on the semantic assessment, a data label having semantic meaning date may be determined from the reference specification, or the configuration file 116. As discussed above, the data points may indicate rules, exemplary values, and other characteristics valid for that data label. Thus, the data points may indicate valid format for the data label having the semantic meaning date. For example, the valid format indicated by the data points may be MMDDYYYY. Thus, the processor 104 may determine that the aspect (format of date) is not in conformity with the correlated aspect (format of date) indicated by the data points. The processor 104 may trigger the data modification workflow to cause modification of the aspect so that the data elements may indicate the entries in MMDDYYYY format, for validating or complying with the reference specification. Thus, by determining a semantically conforming data label from the reference specification, the processor 104 may apply the characteristics and rules indicated by the data points of that data label so that the data elements, associated with the data descriptor determined to be semantically conforming with that data label, can be suitably modified and aligned with the reference specification.

Further, in the above description, the format has been indicated as the aspect for explanation purposes, however, other attributes and aspects of data elements and data points could also be compared with the objective of determining whether the data elements and data points conform with each other, and accordingly modify at least one aspect to conform with the data points, or rules, values, and the like indicated by the data points. One other example of an aspect may include, but is not limited to, comparison of the programming languages used in file record 114 and the reference specification. If the programming languages are determined to be different, the programming language in the file record 114 may be transformed to comply with the programming language of the reference specification. Further, the format may not only indicate format of text, but may also indicate format of the file record itself. For example, if the file record 114 is in a specific format but the reference specification indicates that the destination supports files records in a different format, or structure, the processor 104 may trigger the data modification workflow to modify one or more aspects of the data elements of the file record 114 to comply with the data points of the reference specification. In another example, if the file record 114 indicates one or more visualizations, being data elements, in a particular format (say graph), and the reference specification indicates a different visualization format (say pie chart) as a valid data point, the processor 104 may trigger the data modification workflow to modify the one or more visualizations into the valid visualization format indicated by the data points of the reference specification. Similarly, multiple examples may be possible where the received file record 114, or aspect associated with the file record 114 or contents of the file record 114, may be modified to comply with the reference specification, or with the aspect of the data points of the reference specification.

Thus, in response to the triggering of the data modification workflow, the processor 104 or the data modification unit 610 may modify the file record 114 to include the one or more data elements having the transformed aspect. For instance, as discussed in the above example, the format of the date in the file record 114 may be modified based on the format of date indicated by the data points of the reference specification.

Further, in one example, once the file record 114 has been modified, the processor 104, or the indication generation unit 612, may generate a data representation signal to cause rendering of the modified file record with the one or more data elements having the transformed aspect. In one example, generation of the data representation signal may cause rendering of the modified file record 118 on at least one of the data source 106, the workstations 108, and the destination 110. In another example, the modified file record 118 may also be stored in the database 108 or sent to the destination for generation of one or more visualizations, or any other processing required to be performed on the modified file record by the destination 110.

In one example, the processor 104 may also cause rendering of at least one modification indicator in the modified file record 118 to distinguishingly indicate the one or more data elements, having the transformed aspect, from other of the one or more data elements amongst the plurality of data elements. In one example, the modification indicator may be a coloured marker highlighting the one or more data elements having the transformed aspect, while the other data elements (for which the aspect was not transformed) may not be highlighted in the same manner. In another example, the modification indicator may be an underlining or any other special character that may distinguishingly indicate the one or more data elements for which the aspect was modified or transformed.

Further, in one example, the processor 104 of the data processing unit 608 may perform a preliminary data arrangement workflow prior to the performance of the semantic assessment. The preliminary data arrangement workflow may be performed, in one example, to arrange data elements with semantically conforming data descriptors. For example, it may be possible that the received file record 114 may include data elements that may be associated with data descriptors that are semantically distinct from the data elements. For example, referring to FIG. 7A, it may be possible that the file record 114 may have a name (for example, Jack) associated with the data descriptor date, the name and date thus being semantically distinct from each other. In another example, consider the file record 114 has a table having multiple column labels, one of them being date. The values under such column are ideally required to be entries indicating date. However, there may be situations where erroneous file records 114 may be received. For example, the column may have either no value or any other value (say alphabets only) than the date in the column. Thus, it may be possible that the received file record 114 may include data elements erroneously associated with incorrect or semantically distinct data descriptor. Thus, the processor 104 may perform a pre-conditioning of the file record 114 before the semantic assessment is performed. Such pre-conditioning may assist in improving the performance of the semantic assessment. For example, if the above-discussed file record 114 having only alphabets (say, name of a person) under the column label date is used for performing the semantic assessment, the processor 104 would (1) determine that the data descriptor (column label date) has a data element (name) having an aspect different than what should have been for date; and (2) perform modification, i.e., apply the rules for date on the name present in the column date. Thus, pre-conditioning of the file record 114, in such cases, may assist in performing the semantic assessment with improved accuracy, as aspect of the correct data elements would be modified, thereby enhancing validation and compliance of the file record 114 in an improved manner.

In one example, to perform the preliminary data arrangement workflow, the processor 104 may determine a semantic similarity between each of the data elements in the file record 114 and each of the plurality of the data descriptors in the file record 114. For example, if the file record 114 includes a table, each entry in a table may be semantically checked with each of the column labels. The semantic similarity may be determined in a similar manner as discussed above. Based on the semantic similarity, one or more data elements may be identified that may be semantically conforming with a data descriptor, different from the data descriptor already linked with the one or more data elements, from amongst the plurality of data descriptors. That is, the processor 104 may identify one or more data elements that may be semantically conforming with another data element than the data element with which they are already linked. For instance, considering the above example, the entry name in the column date may have more semantic similarity with another column (say column label name), as compared to the column date with which the entry name is already linked. The processor 104 may then associate, based on the identification, the one or more data elements with the semantically conforming data descriptor. For example, the entry name may be shifted from the column date to the column name. In one example, after such modification, the missing space or entry may be filled with a neutral or default data element, for example, NULL. Further, after the association, the processor 104 may perform the semantic assessment based on the updated file record 114.

In the above examples, the file record 114 has been discussed as having a table, however, other examples may also be possible. For example, the file record 114 may include an array of data elements, as illustrated in FIGS. 3 and 7B. Similarly, other different examples may also be possible.

Further, in one example, the processor 104 may obtain a set of acceptable data elements in response to receiving the file record 114. The set of acceptable data elements may be, in one example, a collection of list of valid data elements. Such a list, in one example, may be a part of the reference specification or may be received separately from at least one of the data source 106 and the configuration file source 108. The processor 104 may compare each data element in the file record 114 with the set of acceptable data elements to identify one or more data elements anomalous or different from the set of acceptable data. Such a comparison may allow the processor 104 to pre-condition the file record 114 by filtering the data elements that are anomalous from the set of acceptable data. Further, based on the comparison, the processor 104, in one example, may generate an alert generation signal to cause rendering of at least one alert to indicate the presence of the anomalous one or more data elements in the file record 114. In one example, generation of the alert generation signal may cause rendering of a visual and/or audio indication on at least one of the data source 106 and the one or more workstations 108. The alert may distinguishingly indicate the one or more data elements that may be anomalous and present in the file record 114. In yet another example, the processor 104 may replace such anomalous data element(s) with a neutral or default data element, for example, NULL. Thus, the present subject matter may assist in validating file record and modification of the file record to enhance compliance with the reference specification, for example, to improve processing of the file record by the destination 110.

Figure 8:
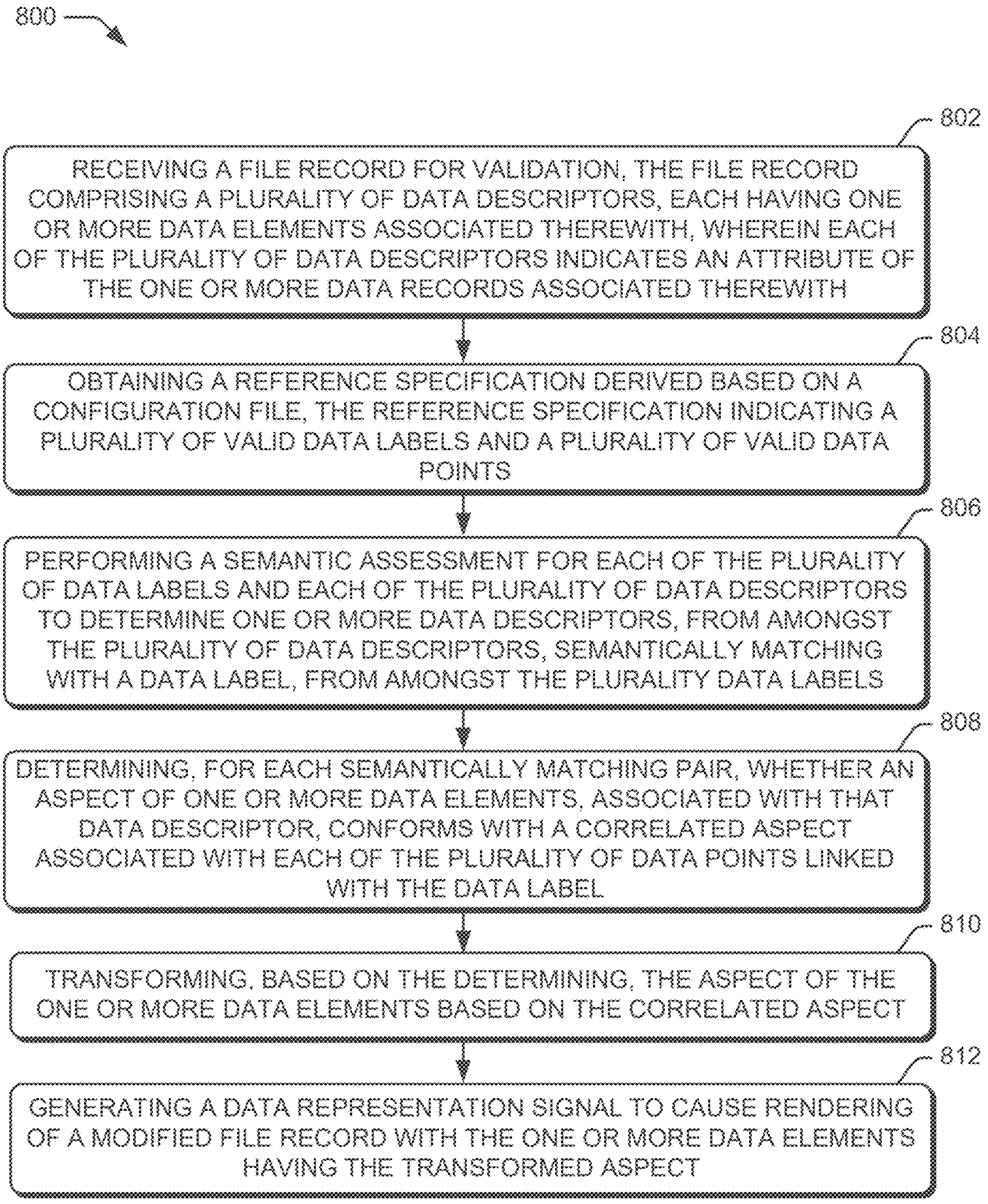
FIG. 8 illustrates a method for validation of a file record, according to an example implementation of the present subject matter.
Figure 9A:
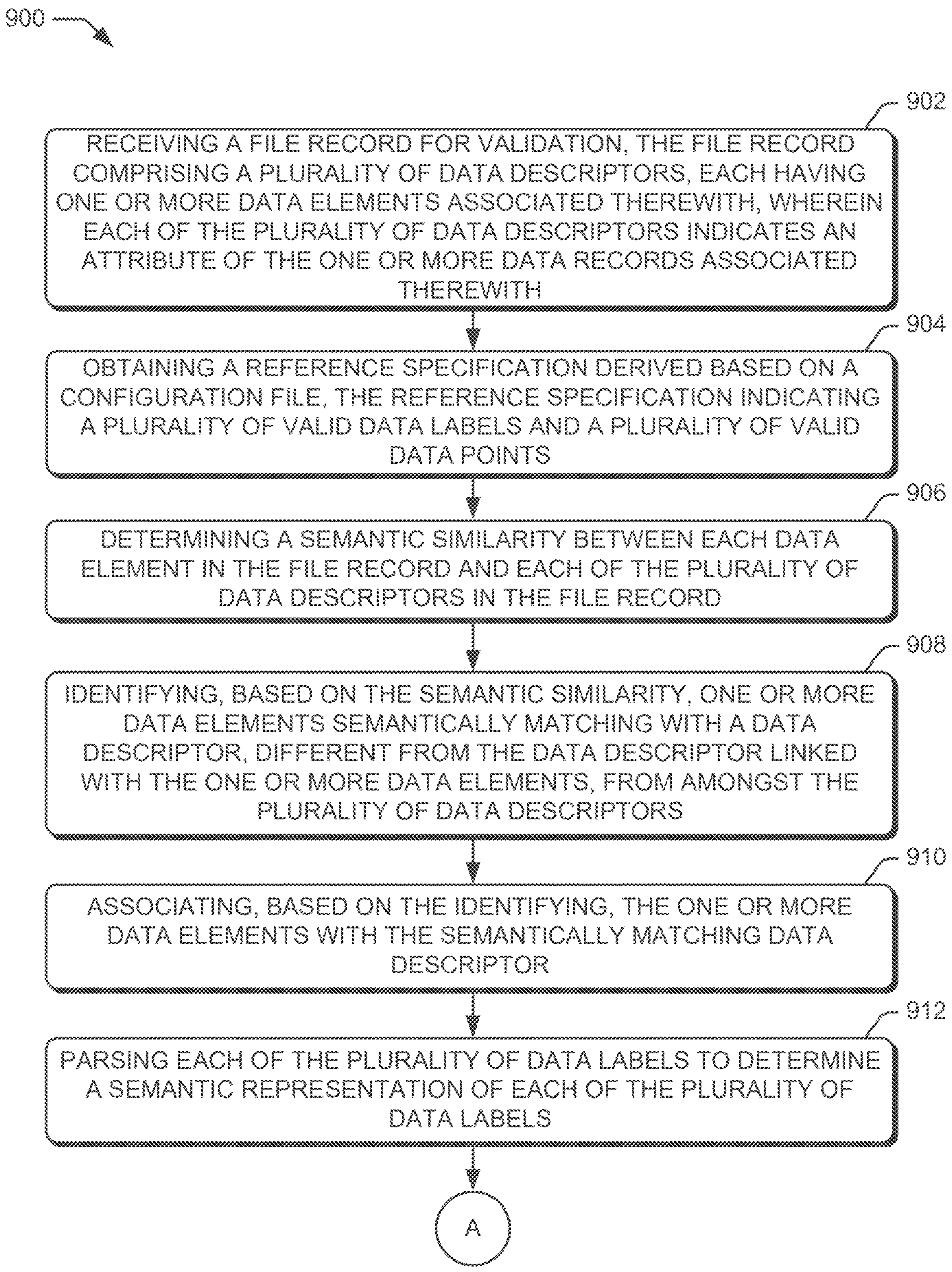
FIGS. 9A to 9C illustrate a method for validation of a file record and modification thereof, according to another example implementation of the present subject matter.
Figure 9B:
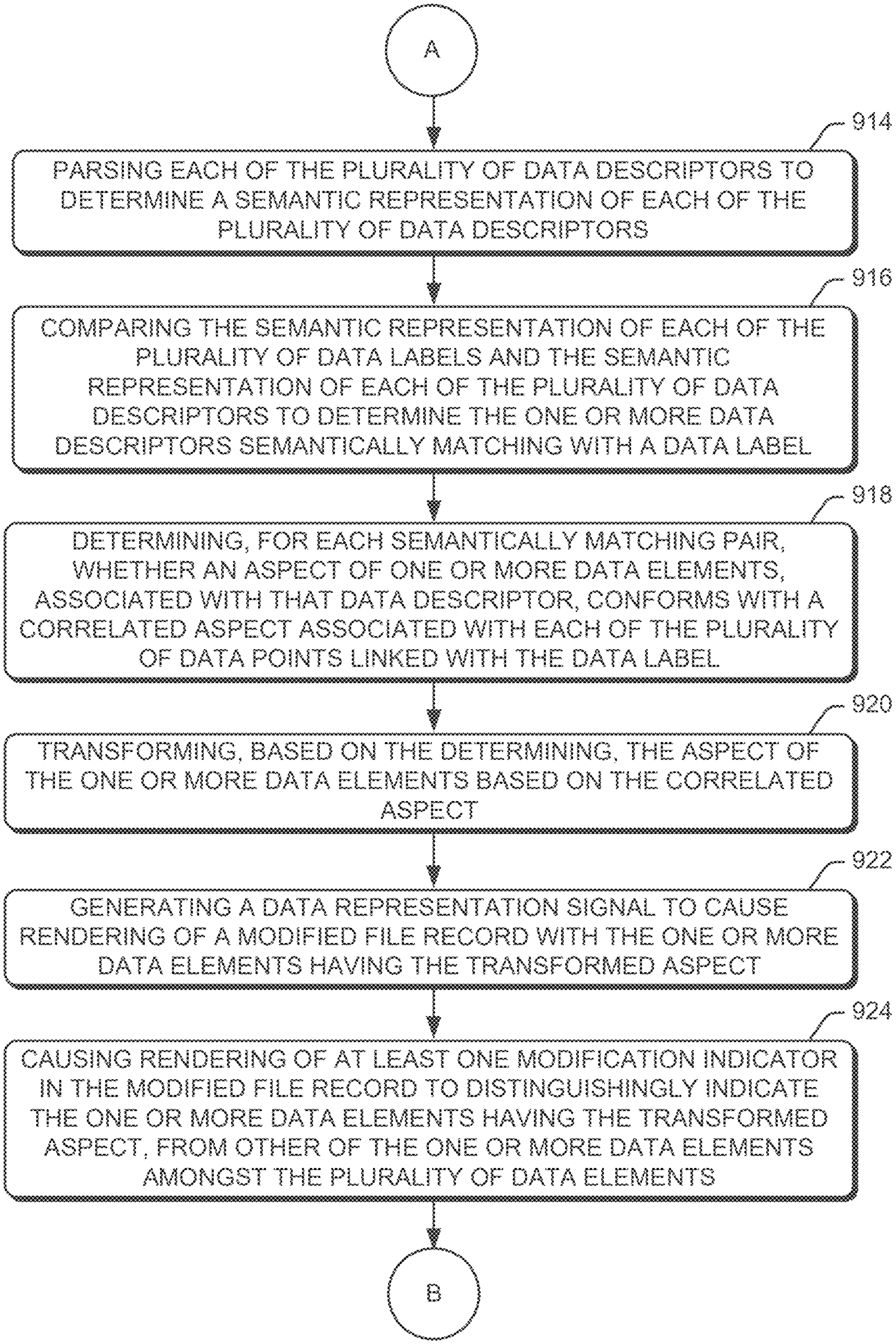
Figure 9C:
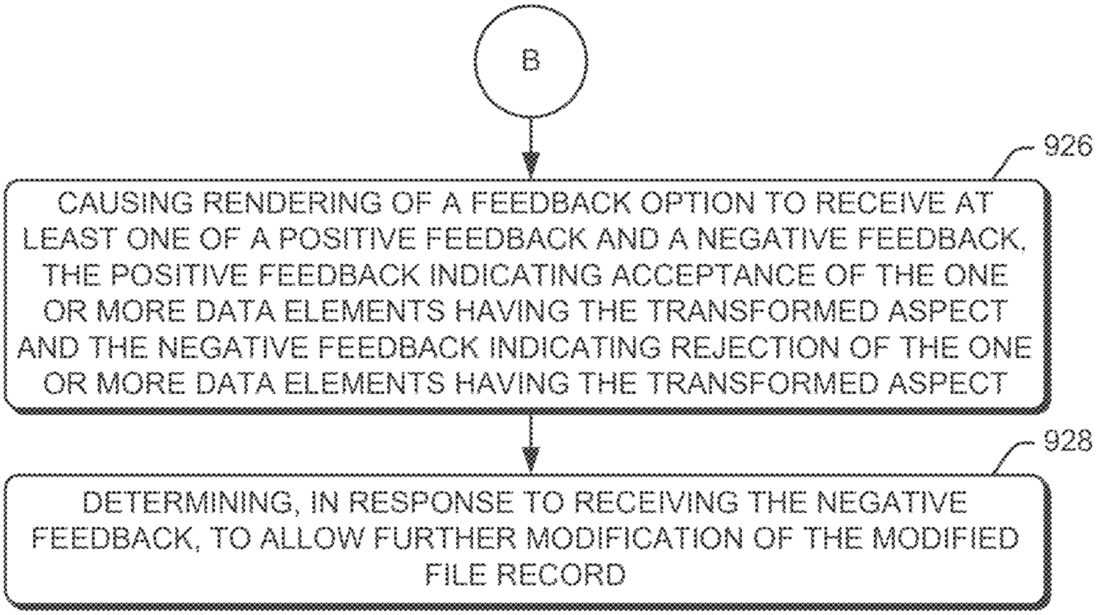

FIGS. 8 to 9C illustrate exemplary methods 800 and 900, respectively, for validation of a file record and modification thereof. The order in which the methods are described is not intended to be construed as a limitation, and any number of the described method blocks may be combined in any order to implement the methods, or an alternative method. Furthermore, methods 800 and 900 may be implemented by processing resource or computing device(s) through any suitable hardware, non-transitory machine-readable instructions, or a combination thereof.

It may also be understood that methods 800 and 900 may be performed by programmed computing devices, such as the processor 104, as depicted in FIGS. 1A-1D, 5, and 6. Furthermore, the methods 800 and 900 may be executed based on instructions stored in a non-transitory computer-readable medium, as will be readily understood. The non-transitory computer-readable medium may include, for example, digital memories, magnetic storage media, such as one or more magnetic disks and magnetic tapes, hard drives, or optically readable digital data storage media. While the methods 800 and 900 are described below with reference to the processor 104 and the system 102 as described above; other suitable systems for the execution of these methods may also be utilized. Additionally, the implementation of these methods is not limited to such examples.

FIG. 8 illustrates the method 800 for validation of a file record, according to an example implementation of the present subject matter.

At block 802, a file record, such as the file record 114, may be received for validation. The file record may comprise, in one example, a plurality of data descriptors, each having one or more data elements associated therewith. Further, each of the plurality of data descriptors indicates an attribute of the one or more data records associated therewith.

At block 804, a reference specification may be obtained in response to receiving the file record. In one example, the reference specification may be derived based on a configuration file, such as the configuration file 116 discussed above. The reference specification, in one example, may indicate a plurality of valid data labels and a plurality of valid data points, as discussed above. Each of the plurality of data points may be classified into a data label from amongst the plurality of data labels.

At block 806, a semantic assessment may be performed for each of the plurality of data labels and each of the plurality of data descriptors to determine one or more data descriptors, from amongst the plurality of data descriptors, that may be semantically matching with a data label, from amongst the plurality data labels of the reference specification.

At block 808, it may be determined, for each semantically matching pair, whether an aspect of one or more data elements, associated with that data descriptor, conforms with a correlated aspect associated with each of the plurality of data points linked with the data label.

At block 810, the aspect of the one or more data elements may be transformed based on the determination.

At block 812, a data representation signal may be generated to cause rendering of a modified file record with the one or more data elements having the transformed aspect.

FIGS. 9A to 9C illustrate the method 900 for validation of a file record and modification thereof, according to another example implementation of the present subject matter. FIGS. 9A to 9C may be discussed in conjunction with FIGS. 1A to 7B, and the subject matter disclosed therewith may be referenced for the sake of brevity.

At block 902, a file record, such as the file record 114, may be received for validation. In one example, the file record 114 may be received by a processor, such as the processor 104, for validation thereof. In one example, the file record may received from a data source, such as the data source 106. In another example, the file record may received from a user via one or more other entities. Such entities may be, for example, software applications, graphical user interfaces, internet or cloud-based platforms, networking devices, and the like.

The file record may comprise, in one example, a plurality of data descriptors, each having one or more data elements associated therewith. Further, each of the plurality of data descriptors indicates an attribute of the one or more data records associated therewith. As discussed above, the data descriptors may be, for example, labels, identifiers, or attributes that may characterize, describe, classify, or categorize a particular type or piece of information or data elements. In some aspects, the data descriptors may also provide information about the nature, type, format, or structure of the associated data element. The data descriptors may either be explicitly or implicit present in the file record. Further, as discussed above, the one or more data elements may be considered the content or records associated with data descriptors. The data elements may be records or values that may, for example, populate a database, spreadsheet, or other data storage format. Examples of data elements may include, but are not limited to, text strings, numerical values, dates, binary data, arrays or lists, geolocation data, encrypted data, and other types of information. A few examples of the file records have been illustrated in FIGS. 2 to 4, 7A, and 7B. However, other examples may also be possible.

At block 904, a reference specification may be obtained in response to receiving the file record. In one example, the processor 104 may obtain the reference specification. The reference specification, in one example, may indicate a plurality of valid data labels and a plurality of valid data points, as discussed above. Each of the plurality of data points may be classified into a data label from amongst the plurality of data labels.

In one example, the reference specification may be obtained from the configuration file source 108, as discussed above. In one example, based on the content of the configuration file 116, the reference specification may be derived. In one example, the configuration file may be parsed to derive the reference specification and one or more aspects associated with each of the plurality of data labels and the plurality of data elements.

As discussed above, the configuration file may be a template or a sample file indicating acceptable, allowable, or valid data, types of data, format of data, and the like. The configuration file may also indicate the one or more aspects of each of the data labels and the data points. For example, if the configuration file 116 includes one or more sample valid data sets of the data labels and the data points, or their valid values, the processor 104 may parse such data set to derive the reference specification indicating the valid data labels, the valid data points for each of the labels, and one or more valid aspects associated with each of the plurality of valid data labels and the plurality of data elements. Examples of the one or more aspects may include, but are not limited to, context, meaning, format, and structure of the data labels and data points. By parsing the configuration file, one or more rules or information may thus be derived, indicating the valid data labels, the valid data points for each of the valid data labels, and one of more aspects of such valid data labels and the data points. Such rules or information, in one example, may be referred to as the reference specification.

At block 906, a semantic similarity may be determined between each data element in the file record and each of the plurality of data descriptors in the file record. In one example, the semantic similarity may be determined to arrange one or more data elements with semantically conforming data descriptors in the file record itself. For example, it may be possible that the received file record may include data elements that may be erroneously associated with data descriptors that are semantically dissimilar from the data elements, as discussed in the above examples. Thus, a pre-conditioning of the file record may be performed by determining the semantic similarity. The semantic similarity may be determined in a similar manner as discussed above.

At block 908, one or more data elements may be identified, based on the semantic similarity, that may be semantically matching with a data descriptor, different from the data descriptor linked with those one or more data elements, from amongst the plurality of data descriptors. For example, one or more data elements may be identified that may be semantically conforming with another data descriptor, in the file record, instead of the data descriptor with which they are already linked in the file record. As discussed in an example above, it may be determined that the entry name in the column label date may have more semantic similarity with another column (say column label name), as compared to the column date with which the entry name is already linked.

At block 910, the one or more data elements may be associated with the semantically matching data descriptor based on the identification. For example, the entry name may be shifted from the column date to the column name, as discussed above. Thus, the file record may include the data elements that may be associated with appropriate data descriptor.

At block 912, each of the plurality of data labels may be parsed to determine a semantic representation of each of the plurality of data labels. In one example, once the data elements have been associated with appropriate data descriptor, semantic assessment may be performed for each of the plurality of data labels and each of the plurality of data descriptors to determine one or more data descriptors semantically matching with a data label. To perform the semantic assessment, each of the plurality of data labels may be parsed to determine their semantic representation. In one example, the semantic representation may be a vector representation of each of the data labels. In another example, the semantic representation may be spatial semantic representations representing each of the data labels in a spatial format as points in a multi-dimensional space. In yet another example, the semantic representation may be a spatial semantic representation of vectors, derived for each of the data labels, in a multi-dimensional space.

From block A and at block 914, each of the plurality of data descriptors may be parsed to determine a semantic representation of each of the plurality of data descriptors. In one example, the semantic representation of each of the plurality of data descriptors may be determined in a similar manner as discussed above and as determined for the plurality of data labels.

At block 916, the semantic representation of each of the plurality of data labels and the semantic representation of each of the plurality of data descriptors may be compared to determine the one or more data descriptors semantically conforming with a data label, from amongst the plurality of data labels. As discussed above in one example, distance between the points or vectors may indicate a measure or extent of semantic similarity between the data labels and the data descriptors. For example, semantically similar data labels and data descriptors may be positioned closer together and have a lesser distance. In one example, the distance may be between pairs of data labels and data descriptors, such that each pair comprises a data descriptor and a data label at least once. For example, a pair may include a point or a vector of data descriptor 1 and data label 1; and another pair may include a points or a vector of data descriptor 2 and data label 1. Similarly, for each data label and each data descriptor, a pair may be formed and the distance may be a distance between those points or vectors. In one example, the one or more data descriptors semantically conforming with the data label may be determined based on the distance. Thus, based on the semantic assessment, determine one or more semantically conforming pairs may be determined. Each of the pairs may include, for example, a data descriptor semantically conforming with a data label.

At block 918, it may be determined, for each semantically matching pair, whether an aspect of one or more data elements, associated with that data descriptor, conforms with a correlated aspect associated with each of the plurality of data points linked with the data label. In one example, the aspect of the one or more data elements may be format of the one or more data elements. The corresponding aspect may thus be the format of each of the one or more data points. As discussed above, the data points may indicate different characteristics, exemplary values, or rules allowed or valid for a data label. In one example, one such characteristic or aspect may be valid format indicated by the data points. Thus, in one example, to determine whether the aspect (for example, format or structure) of the one or more data elements conforms with the corresponding aspect of each of the data points, the one or more data elements may be compared with each of the data points.

If it is determined that the aspect conforms with the correlated aspect, the file record may be determined to comply with the reference specification, and the method may flow back to block 902. However, if it is determined that the aspect is different than the correlated aspect, the file record may be determined to be non-compliant with the reference specification, and the method may flow to block 920.

At block 920, the aspect of the one or more data elements may be transformed based on the correlated aspect. In one example, a data modification workflow may be triggered to cause modification of the aspect of the one or more data elements. In one example, the aspect of the data elements may be transformed in such a manner that the aspect complies with the correlated aspect. The aspect may be transformed as discussed above with reference to FIG. 6. In response to the triggering of the data modification workflow, the file record may be modified to include the one or more data elements having the transformed aspect.

At block 922, a data representation signal may be generated to cause rendering of a modified file record, such as the modified file record 118, with the one or more data elements having the transformed aspect. For example, once the file record has been modified, the data representation signal may be generated. Generation of the data representation signal may cause rendering of the modified file record, for example, on at least one of the data source 106, the workstations 108, and the destination 110.

At block 924, rendering of at least one modification marker may be caused in the modified file record to distinguishingly indicate the one or more data elements having the transformed aspect, from other of the one or more data elements amongst the plurality of data elements. In one example, the modification indicator may be a special marker that may highlight the one or more data elements having the transformed aspect, while the other data elements (for which the aspect was not transformed) may not be highlighted in the same manner. Examples of the special marker may include, bur are not limited to, coloured markers, underlining, and special characters that may distinguishingly indicate the one or more data elements for which the aspect was modified or transformed.

From block B and at block 926, rendering of a feedback option may be caused to receive at least one of a positive feedback and a negative feedback. In one example, the positive feedback may indicate acceptance of the one or more data elements having the transformed aspect and the negative feedback may indicate rejection of the one or more data elements having the transformed aspect. In one example, the feedback option may be rendered on at least one of the data source 106, the workstations 108, and the destination 110 to receive a feedback from a user about the transformation of the aspect, or the modified file record as a whole. In case the user determines that the transformation of the aspect is incorrect, or has not actually modified the aspect, the user may submit the negative feedback by interacting with the feedback option being rendered. However, if the user determines that the transformation of the aspect is correct, the user may submit the positive feedback by interacting with the feedback option being rendered. Once the positive feedback has been received, the modified file record, for example, may be stored in the database 108; or sent to the destination 110 for generation of one or more visualizations, or any other processing required to be performed on the modified file record by the destination.

In response to receiving the negative feedback, the method may flow to block 928. At block 928, it may be determined to allow further modification of the modified file record. In one example, the user may be allowed to manually modify the modified file record to enhance the compatibility of the modified file record, for instance, for the destination 110, and thereby validate the file record with the destination 110. In one example, an interactive graphical user interface may be rendered to allow the user to manually modify the modified file record. The interactive graphical user interface may be rendered on at least one of the data source 106, the workstations 108, and the destination 110.

FIG. 10 illustrates a non-transitory computer-readable medium for file record validation, in accordance with an example of the present subject matter. FIG. 10 will be discussed with reference to FIGS. 1A to 6 and the description associated therewith is referenced for the sake of brevity.

In an example, the computing environment 1000 includes a processor 1002 communicatively coupled to a non-transitory computer-readable medium 1004 through communication link 1006. In one example, the processor 1002 may have one or more processing resources for fetching and executing computer-readable instructions from the non-transitory computer-readable medium 1004. The processor 1002 and the non-transitory computer-readable medium 1004 may be implemented, for example, in the system 102.

The non-transitory computer-readable medium 1004 may be, for example, an internal memory device or an external memory. In an example implementation, the communication link 1006 may be a network communication link, or other communication links, such as a PCI (Peripheral component interconnect) Express, USB-C (Universal Serial Bus Type- C) interfaces, I2C (Inter-Integrated Circuit) interfaces, etc. In an example implementation, the non-transitory computer-readable medium 1004 includes a set of computer-readable instructions 1008 which may be accessed by the processor 1002 through the communication link 1006. The processor 1002 and the non-transitory computer-readable medium 1004 may also be communicatively coupled to the data source 106, the configuration file source 108, and the destination 110 over the communication link 1006.

Referring to FIG. 10, in one example, the non-transitory computer-readable medium 1004 includes computer-readable instructions 1008 that may cause the processor 1002 to obtain, in response to receiving a file record for validation thereof, a reference specification indicating a plurality of valid data labels and a plurality of valid data points. Each of the plurality of data points may be classified or linked to a data label from amongst the plurality of data labels. Further, the file record comprises a plurality of data descriptors, each having one or more data elements associated therewith. In one example, the file record, such as the file record 114, may be received from the data source 106. In another example, the file record 114 may be received from a user via one or more other entities. Such entities may be, for example, software applications, graphical user interfaces, internet or cloud-based platforms, networking devices, and the like.

Further, each of the plurality of data descriptors indicates an attribute of the one or more data records associated therewith. As discussed above, the data descriptors may be, for example, labels, identifiers, or attributes that may characterize, describe, classify, or categorize a particular type or piece of information or data elements. In some aspects, the data descriptors may also provide information about the nature, type, format, or structure of the associated data element. The data descriptors may either be explicitly or implicit present in the file record 114. Further, as discussed above, the one or more data elements may be considered the content or records associated with data descriptors. The data elements may be records or values that may, for example, populate a database, spreadsheet, or other data storage format. Examples of data elements may include, but are not limited to, text strings, numerical values, dates, binary data, arrays or lists, geolocation data, encrypted data, and other types of information. A few examples of the file records have been illustrated in FIGS. 2 to 4, 7A, and 7B.

Further, the reference specification may be obtained in response to receiving the file record 114, as discussed above. In one example, the reference specification may be obtained from the configuration file 116. In another example, the reference specification may be rules or information derived based on the configuration file 116, as discussed above.

The non-transitory computer-readable medium 1004 includes computer-readable instructions 1008 that may further cause the processor 1002 to determine a semantic similarity between each data element in the file record 114 and each of the plurality of data descriptors in the file record 114. In one example, the semantic similarity may be determined to arrange one or more data elements with semantically conforming data descriptors in the file record itself. For example, it may be possible that the received file record 114 may include data elements that may be erroneously associated with data descriptors that are semantically dissimilar from the data elements, as discussed in the above examples. Thus, a pre-conditioning of the file record may be performed by determining the semantic similarity. The semantic similarity may be determined in a similar manner as discussed above.

The non-transitory computer-readable medium 1004 includes computer-readable instructions 1008 that may further cause the processor 1002 to identify, based on the semantic similarity, one or more data elements semantically conforming with a data descriptor, different from the data descriptor already linked with the one or more data elements, from amongst the plurality of data descriptors. For example, one or more data elements may be identified that may be semantically similar with another data descriptor, in the file record 114, instead of the data descriptor with which they are already linked in the file record 114. As discussed in an example above, it may be determined that the entry name in the column label date may have more semantic similarity with another column (say column label name), as compared to the column date with which the entry name is already linked.

The non-transitory computer-readable medium 1004 includes computer-readable instructions 1008 that may further cause the processor 1002 to associate, based on the identification, the one or more data elements with the semantically conforming data descriptor. Thus, the file record 114 may include the data elements that may be associated with semantically appropriate data descriptor.

The non-transitory computer-readable medium 1004 includes computer-readable instructions 1008 that may further cause the processor 1002 to perform a semantic assessment for each of the plurality of data labels and each of the plurality of data descriptors to determine a semantic score for each of the plurality of data descriptors of the file record 114. The semantic score may indicate a measure of semantic similarity between each of the plurality of data descriptors and each of the plurality of data labels. In one example, the semantic score may be determined based on the semantic representations of each of the data labels and the data descriptors, as discussed above. For example, a distance, determined based on the semantic representations, as discussed above, may be the semantic score. The data descriptor may have the shortest distance with the data label, from amongst the plurality of data labels, that may be most semantically similar or matching with that data descriptor.

The non-transitory computer-readable medium 1004 includes computer-readable instructions 1008 that may further cause the processor 1002 to identify, based on the semantic score of each of the plurality of data descriptors, one or more data descriptors, from amongst the plurality of data descriptors, semantically matching with a data label, from amongst the plurality of data labels of the reference specification. In one example, as the semantic score may be the distance, the data label having the shortest distance with the data descriptor may be determined to be the semantically matching data label. Similarly, one or more data descriptors may be identified.

The non-transitory computer-readable medium 1004 includes computer-readable instructions 1008 that may further cause the processor 1002 to determine whether an aspect of one or more data elements, associated with each of the data descriptors semantically matching with the data label, conforms with a correlated aspect associated with each of the plurality of data points linked with the data label. In one example, the aspect of the one or more data elements may be format of the one or more data elements. The corresponding aspect may thus be the format of each of the one or more data points.

If it is determined that the aspect conforms with the correlated aspect, the file record 114 may be determined to be valid with respect to the reference specification. However, if it is determined that the aspect is different than the correlated aspect, the file record 114 may be determined to be invalid with respect to the reference specification.

The non-transitory computer-readable medium 1004 includes computer-readable instructions 1008 that may further cause the processor 1002 to trigger, based on the determination, transformation of the aspect of the one or more data elements. In one example, the aspect of the data elements may be transformed in such a manner that the aspect complies with the correlated aspect. The aspect may be transformed as discussed above with reference to FIG. 6. In response to the triggering of the data modification workflow, the file record may be modified by the processor 1002 to include the one or more data elements having the transformed aspect.

The non-transitory computer-readable medium 1004 includes computer-readable instructions 1008 that may further cause the processor 1002 to cause rendering of a modified file record, such as the modified file record 118, with the one or more data elements having the transformed aspect. For example, once the file record has been modified, the modified file record may be rendered on at least one of the data source 106, the workstations 108, and the destination 110.

The non-transitory computer-readable medium 1004 includes computer-readable instructions 1008 that may further cause the processor 1002 to cause rendering of at least one modification marker in the modified file record 118 to distinguishingly indicate the one or more data elements having the transformed aspect, from other of the one or more data elements amongst the plurality of data elements. In one example, the modification indicator may be a special marker that may highlight the one or more data elements having the transformed aspect, while the other data elements (for which the aspect was not transformed) may not be highlighted in the same manner, as discussed above.

The non-transitory computer-readable medium 1004 includes computer-readable instructions 1008 that may further cause the processor 1002 to cause rendering of a feedback option to receive at least one of a positive feedback and a negative feedback. In one example, the positive feedback may indicate acceptance of the one or more data elements having the transformed aspect and the negative feedback may indicate rejection of the one or more data elements having the transformed aspect. In one example, the feedback option may be rendered on at least one of the data source 106, the workstations 108, and the destination 110 to receive feedback from a user about the transformation of the aspect. In case the user determines that the transformation of the aspect is incorrect, or has not actually modified the aspect, the user may submit the negative feedback by interacting with the feedback option being rendered. However, if the user determines that the transformation of the aspect is correct, the user may submit the positive feedback by interacting with the feedback option being rendered. Once the positive feedback has been received, the modified file record, for example, may be stored in the database 108; or sent to the destination 110 for generation of one or more visualizations, or any other processing required to be performed on the modified file record by the destination.

In response to receiving the negative feedback, the processor 1002 may allow further modification of the modified file record 118. In one example, the processor 1002 may cause rendering of an interactive graphical user interface to allow the user to manually modify the modified file record. The interactive graphical user interface may be rendered on at least one of the data source 106, the workstations 108, and the destination 110. Thus, the present subject matter may assist in validation of the filed record 114 and modification thereof to enhance compliance to the file record 114.

Although examples of the present subject matter have been described in language specific to methods and/or structural features, it is to be understood that the present subject matter is not limited to the specific methods or features described. Rather, the methods and specific features are disclosed and explained as examples of the present subject matter.

What is claimed is:

1. A system comprising:

a processor to:

receive a file record for validation, the file record comprising a plurality of data descriptors, each having one or more data elements associated therewith, wherein each of the plurality of data descriptors indicates an attribute of one or more data records associated therewith;

obtain, in response to receiving a file record for validation thereof, a reference specification indicating a plurality of valid data labels and a plurality of valid data points, wherein each of the plurality of data points is classified into a data label from amongst the plurality of data labels;

parse the plurality of data descriptors and the plurality of data labels to determine respective semantic representations of the plurality of data descriptors and the plurality of data labels;

perform a semantic assessment between the file record and the reference specification to determine one or more data descriptors, from amongst the plurality of data descriptors, semantically conforming with one data label, from amongst the plurality of data labels of the reference specification, wherein the semantic assessment is performed to map the one or more data descriptors to the plurality of data points, and wherein the semantic assessment comprises:

computing a similarity score between the semantic representations of the plurality of data descriptors and the plurality of data labels; and identifying one or more descriptor-label pairs based on comparison of the similarity score to a threshold similarity score;

determine, for each semantically conforming the one or more descriptor-label pair, whether an aspect of one or more data elements, associated with that data descriptor, conforms with a correlated aspect associated with each of the plurality of data points linked with the one data label, wherein the aspect comprises at least a format of the one or more data elements;

trigger, based on the determination, a data modification workflow to cause modification of the aspect of the one or more data elements, wherein the modification is to transform the aspect of the one or more data elements based on the correlated aspect; and modify, in response to triggering of the data modification workflow, the file record to include the one or more data elements having the transformed aspect.

2. The system of claim 1, wherein the aspect of one or more data elements is a format of the one or more data elements.

3. The system of claim 1, wherein the processor is to generate a data representation signal to cause rendering of the modified file record with the one or more data elements having the transformed aspect.

4. The system of claim 3, wherein the processor is to cause rendering of at least one modification indicator in the modified file record to distinguishingly indicate the one or more data elements, having the transformed aspect, from other of the one or more data elements.

5. The system of claim 1, wherein, prior to performance of the semantic assessment, the processor is to perform a preliminary data arrangement workflow to:

determine a semantic similarity between each data element in the file record and each of the plurality of data descriptors in the file record;

identify, based on the semantic similarity, one or more data elements semantically conforming with a data descriptor, different from the data descriptor already linked with the one or more data elements, from amongst the plurality of data descriptors; and associate, based on the identification, the one or more data elements with the semantically conforming data descriptor.

6. The system of claim 1, wherein the processor is to:

obtain, in response to receiving the file record, a set of acceptable data elements;

compare each data element in the file record with the set of acceptable data elements to identify one or more data elements anomalous from the set of acceptable data; and generate, based on the comparison, an alert generation signal to cause rendering of at least one alert to indicate presence of the anomalous one or more data elements in the file record.

7. The system of claim 6, wherein the processor is to replace the anomalous one or more data elements with a default data element.

8. The system of claim 1, wherein the processor is to:

determine, based on the semantic representation of each of the plurality of data labels and the semantic representation of each of the plurality of data descriptors, the one or more data descriptors semantically conforming with the one data label.

9. The system of claim 1, wherein the processor is to:

compute the similarity score for quantifying a semantic conformity between the semantic representation of each of the plurality of data labels and the semantic representation of each of the plurality of data descriptors; and compare the similarity score with the threshold similarity score to identify the one or more data descriptors having semantic conformity with at least one data label from amongst the plurality of data labels.

10. The system of claim 1, wherein each of the plurality of data labels indicates a characteristic of the one or more data points linked therewith, and wherein each of the plurality of data descriptors indicates at least one attribute of the one or more data elements associated therewith.

11. A method comprising:

receiving a file record for validation, the file record comprising a plurality of data descriptors, each having one or more data elements associated therewith, wherein each of the plurality of data descriptors indicates an attribute of the one or more data records associated therewith;

obtaining, in response to receiving the file record, a reference specification derived based on a configuration file, the reference specification indicating a plurality of valid data labels and a plurality of valid data points, wherein each of the plurality of data points is classified into a data label from amongst the plurality of data labels;

parsing the plurality of data descriptors and the plurality of data labels to determine respective semantic representations of the plurality of data descriptors and the plurality of data labels;

performing a semantic assessment for each of the plurality of data labels and each of the plurality of data descriptors to determine one or more data descriptors, from amongst the plurality of data descriptors, semantically matching with a data label, from amongst the plurality data labels of the reference specification, wherein the semantic assessment is performed to map the one or more data descriptors to the plurality of data points, and wherein the semantic assessment comprises of:

computing a similarity score between the semantic representations of the plurality of data descriptors and the plurality of data labels; and identifying one or more descriptor-label pairs based on comparison of the similarity score to a threshold similarity score;

determining, for each semantically matching the one or more descriptor-label pair, whether an aspect of one or more data elements, associated with that data descriptor, conforms with a correlated aspect associated with each of the plurality of data points linked with the data label, wherein the aspect comprises at least a format of the one or more data elements;

transforming, based on the determining, the aspect of the one or more data elements based on the correlated aspect; and generating a data representation signal to cause rendering of a modified file record with the one or more data elements having the transformed aspect.

12. The method of claim 11, wherein the method further comprises parsing the configuration file to derive the reference specification and one or more aspects associated with each of the plurality of data labels and the data elements.

13. The method of claim 11, wherein the method further comprises causing rendering of at least one modification indicator in the modified file record to distinguishingly indicate the one or more data elements, having the transformed aspect, from other of the one or more data elements.

14. The method of claim 11, wherein the method further comprises:

determining a semantic similarity between each data element in the file record and each of the plurality of data descriptors in the file record;

identifying, based on the semantic similarity, one or more data elements semantically matching with a data descriptor, different from the data descriptor linked with the one or more data elements, from amongst the plurality of data descriptors; and associating, based on the identifying, the one or more data elements with the semantically matching data descriptor.

15. The method of claim 11, wherein the method further comprises:

comparing the semantic representation of each of the plurality of data labels and the semantic representation of each of the plurality of data descriptors to determine the one or more data descriptors semantically matching with the data label.

16. The method of claim 11, the method further comprising causing rendering of a feedback option to receive at least one of a positive feedback and a negative feedback, the positive feedback indicating acceptance of the one or more data elements having the transformed aspect and the negative feedback indicating rejection of the one or more data elements having the transformed aspect.

17. A non-transitory computer-readable medium comprising instructions, the instructions being executable by a processing resource to:

receive a file record for validation, the file record comprising a plurality of data descriptors, each having one or more data elements associated therewith, wherein each of the plurality of data descriptors indicates an attribute of the one or more data records associated therewith;

obtain, in response to receiving a file record for validation thereof, a reference specification indicating a plurality of valid data labels and a plurality of valid data points, wherein each of the plurality of data points is classified into a data label from amongst the plurality of data labels;

parse the plurality of data descriptors and the plurality of data labels to determine respective semantic representations of the plurality of data descriptors and the plurality of data labels;

perform a semantic assessment for each of the plurality of data labels and each of the plurality of data descriptors to determine a semantic score for each of the plurality of data descriptors of the file record, the semantic score indicating a measure of semantic similarity between each of the plurality of data descriptors and each of the plurality of data labels, wherein the semantic assessment is performed to map the one or more data descriptors to the plurality of data points, and wherein the semantic assessment comprises of:

computing a similarity score between the semantic representations of the plurality of data descriptors and the plurality of data labels; and identifying one or more descriptor-label pairs based on comparison of the similarity score to a threshold similarity score;

identify, based on the semantic score of each of the plurality of data descriptors, one or more data descriptors, from amongst the plurality of data descriptors, semantically matching with a data label, from amongst the plurality data labels of the reference specification;

determine whether an aspect of one or more data elements, associated with each of the one or more data descriptors semantically matching with the data label, conforms with a correlated aspect associated with each of the plurality of data points linked with the data label, wherein the aspect comprises at least a format of the one or more data elements;

trigger, based on the determination, transformation of the aspect of the one or more data elements based on the correlated aspect, wherein the transformation is to align the aspect of the one or more data elements with the correlated aspect;

modify, in response to triggering of the transformation, the file record to include the one or more data elements having the transformed aspect; and cause rendering of the modified file record with the one or more data elements having the transformed aspect.

18. The non-transitory computer-readable medium of claim 17, the instructions being executable by the processing resource to cause rendering of at least one modification indicator in the modified file record to distinguishingly indicate the one or more data elements, having the transformed aspect, from other of the one or more data elements.

19. The non-transitory computer-readable medium of claim 17, the instructions being executable by the processing resource to:

determine a semantic similarity between each data element in the file record and each of the plurality of data descriptors in the file record;

identify, based on the semantic similarity, one or more data elements semantically conforming with a data descriptor, different from the data descriptor already linked with the one or more data elements, from amongst the plurality of data descriptors; and associate, based on the identification, the one or more data elements with the semantically conforming data descriptor.

20. The non-transitory computer-readable medium of claim 17, the instructions being executable by the processing resource to cause rendering of a feedback option to receive at least one of a positive feedback and a negative feedback, the positive feedback indicating acceptance of the one or more data elements having the transformed aspect and the negative feedback indicating rejection of the one or more data elements having the transformed aspect.

* * * * *